United States Patent
Kimura

(10) Patent No.: US 8,964,304 B2
(45) Date of Patent: Feb. 24, 2015

(54) ZOOM LENS AND IMAGE PICKUP APPARATUS EQUIPPED WITH THE SAME

(71) Applicant: Canon Kabushiki Kaisha, Tokyo (JP)

(72) Inventor: Tomonori Kimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 13/749,551

(22) Filed: Jan. 24, 2013

(65) Prior Publication Data

US 2013/0194465 A1 Aug. 1, 2013

(30) Foreign Application Priority Data

Jan. 30, 2012 (JP) ................ 2012-016350

(51) Int. Cl.
- *G02B 15/14* (2006.01)
- *G02B 15/16* (2006.01)
- *G02B 15/173* (2006.01)

(52) U.S. Cl.
CPC .............. *G02B 15/14* (2013.01); *G02B 15/173* (2013.01)
USPC .......................................... 359/687; 359/676

(58) Field of Classification Search
USPC .................................................. 359/683, 687
See application file for complete search history.

(56) References Cited

U.S. PATENT DOCUMENTS

| | | | |
|---|---|---|---|
| 5,859,729 A | 1/1999 | Misaka | |
| 6,185,048 B1 | 2/2001 | Ishii et al. | |
| 6,744,571 B2 * | 6/2004 | Ishii et al. | ...... 359/795 |
| 7,764,438 B2 | 7/2010 | Kamo et al. | |
| 8,625,204 B2 * | 1/2014 | Okubo | ...... 359/687 |

* cited by examiner

*Primary Examiner* — Scott J Sugarman
(74) *Attorney, Agent, or Firm* — Canon USA Inc IP Division

(57) ABSTRACT

A zoom lens includes a first lens unit having positive refractive power, a second lens unit having negative refractive power, a third lens unit having positive refractive power, and a fourth lens unit having positive refractive power. During zooming from a wide-angle end to a telephoto end, each lens unit moves so that a distance between the first lens unit and the second lens unit increases, and a distance between the second lens unit and the third lens unit decreases. Each of the first lens unit, the second lens unit, and the third lens unit consists of a single positive lens and a single negative lens, and the fourth lens unit consists of a single positive lens. Focal lengths of the entire zoom lens at the wide-angle end and the telephoto end and focal lengths of the first lens unit and the second lens unit are appropriately set.

16 Claims, 31 Drawing Sheets

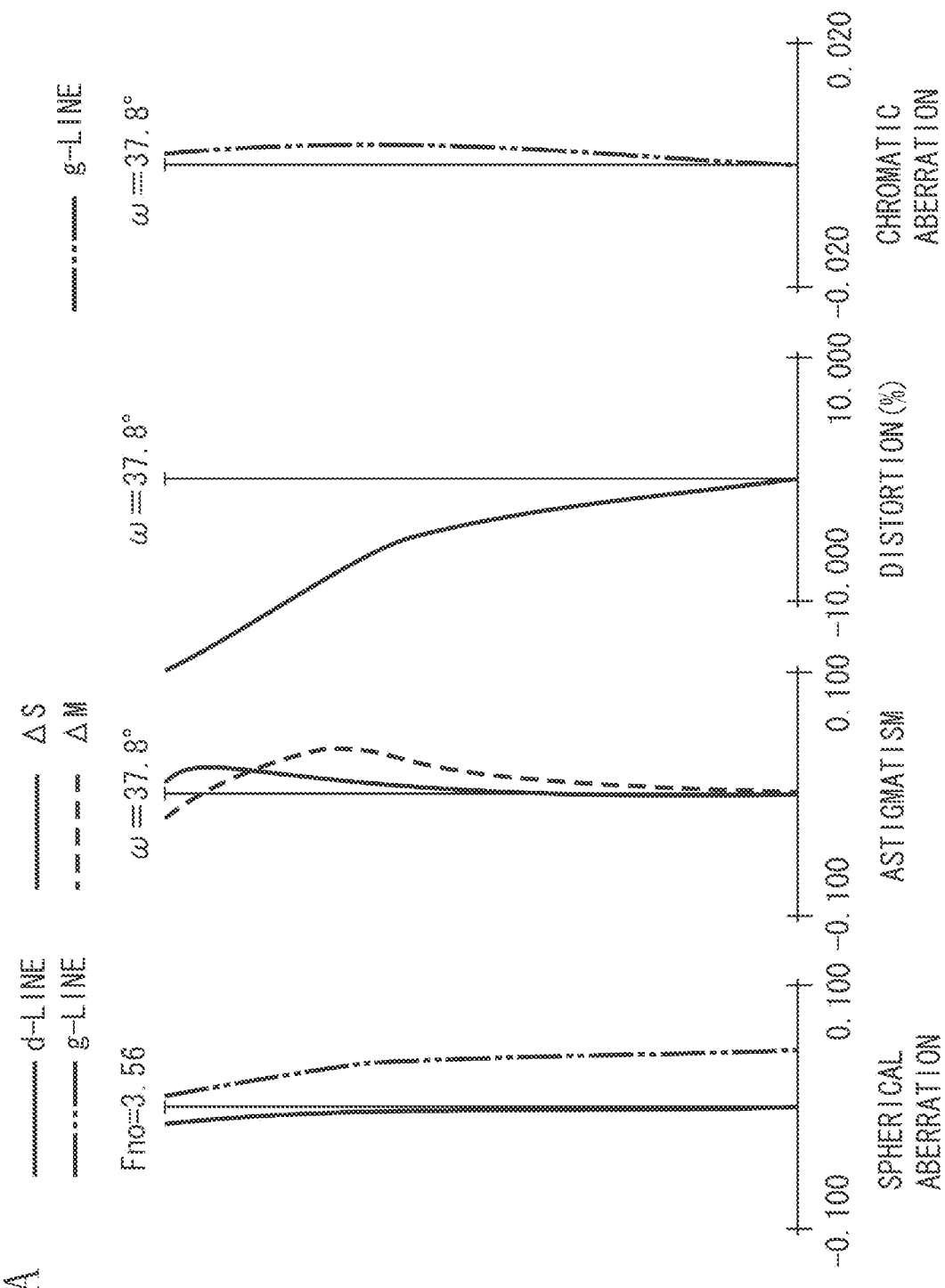

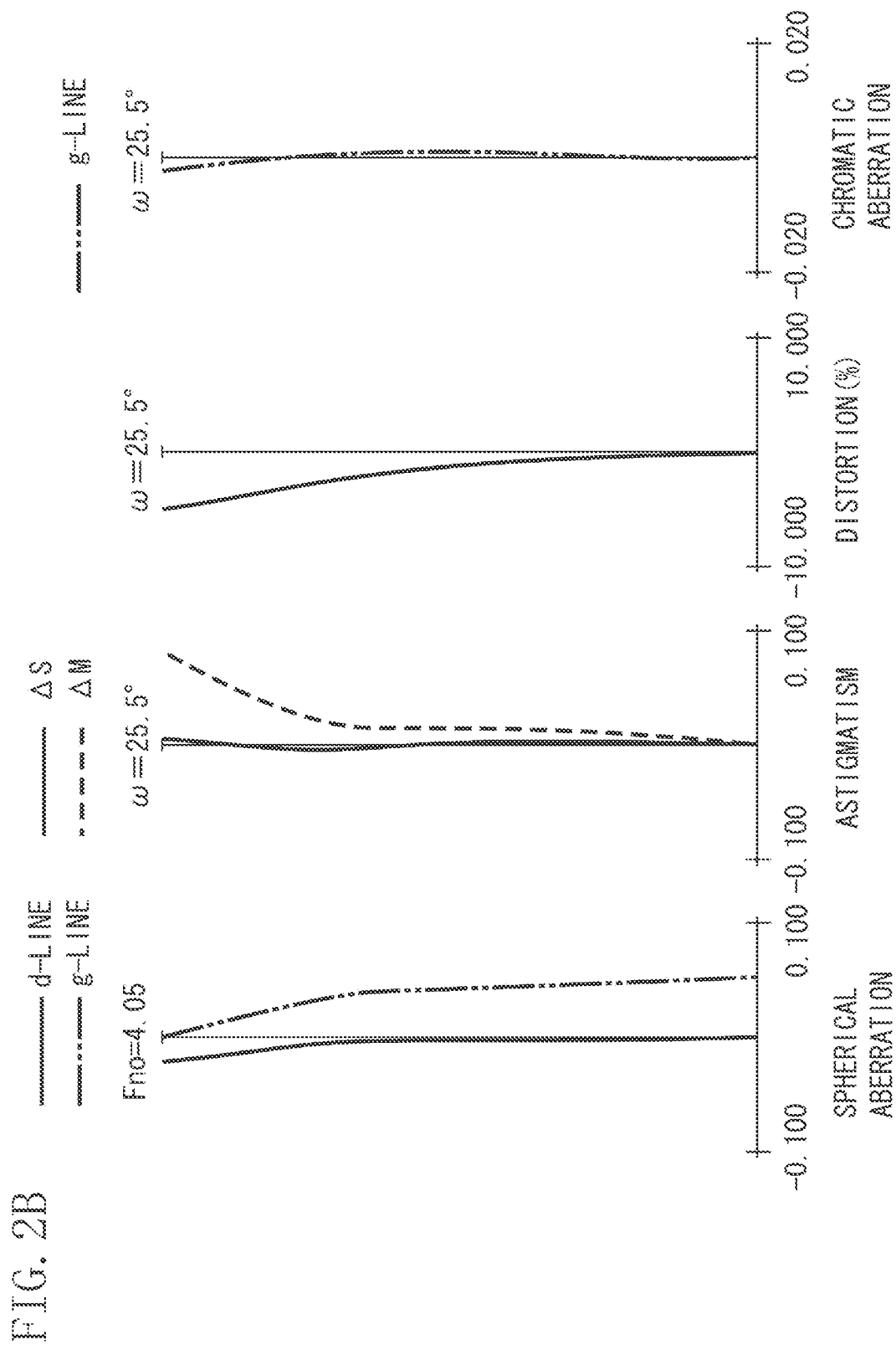

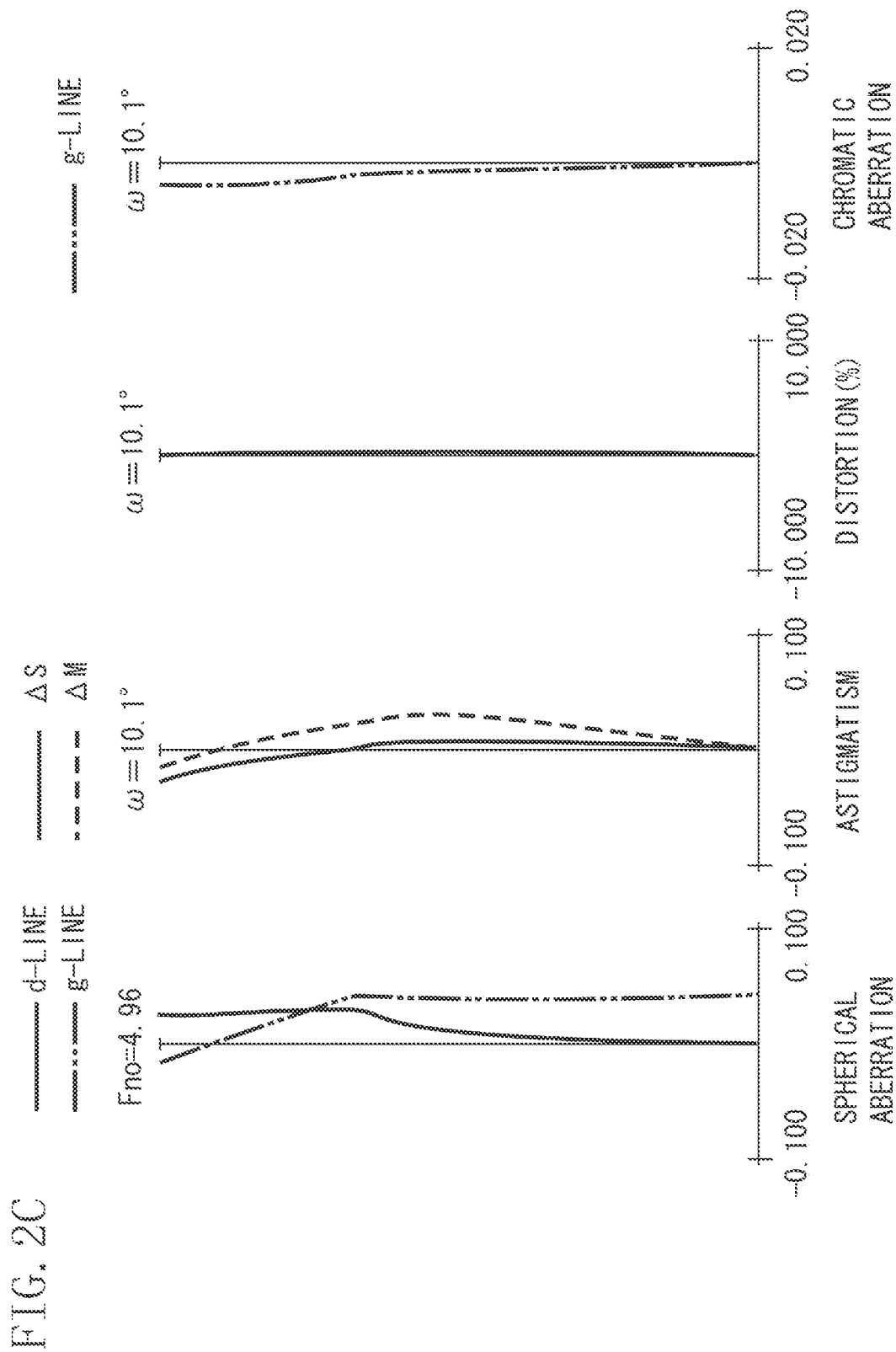

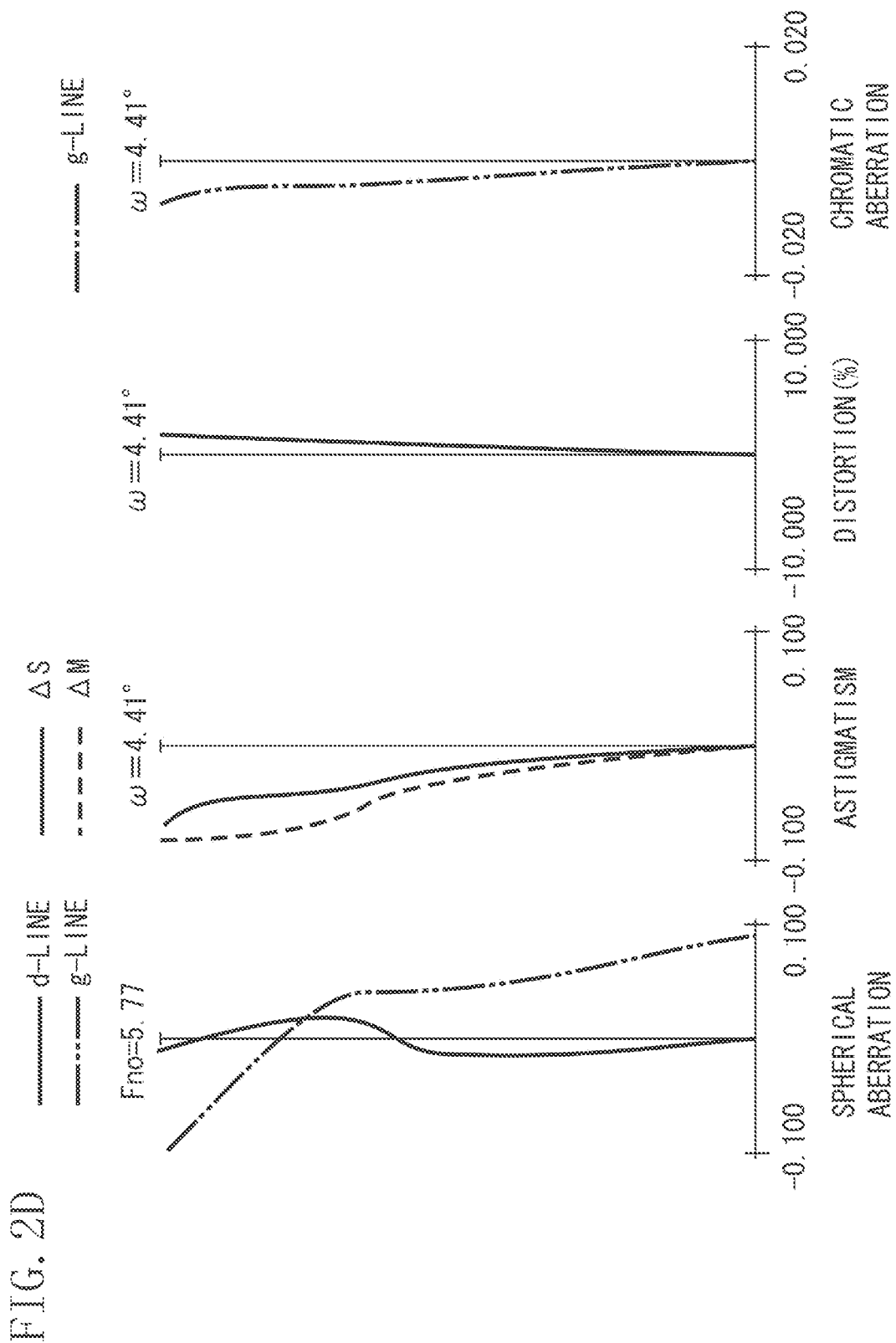

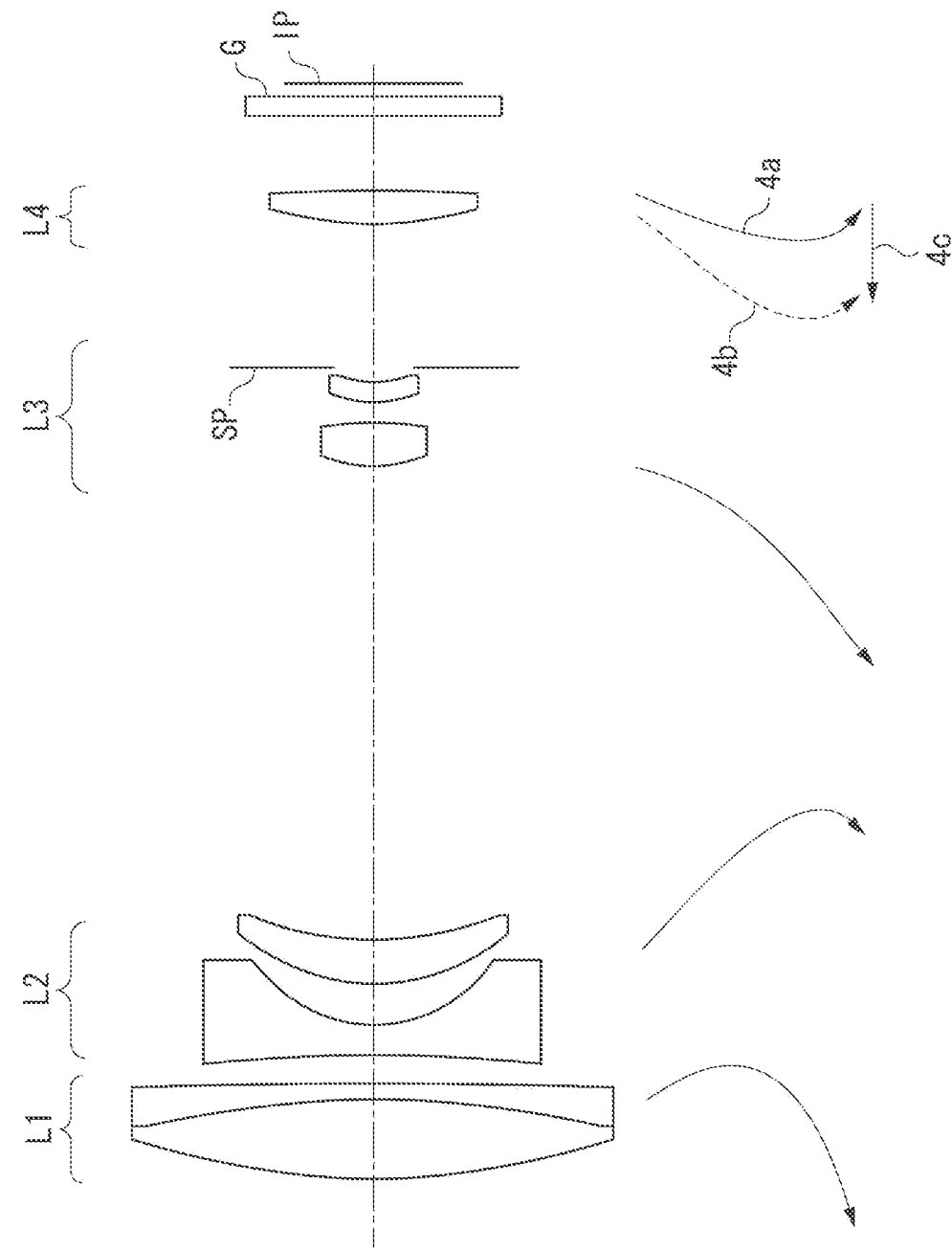

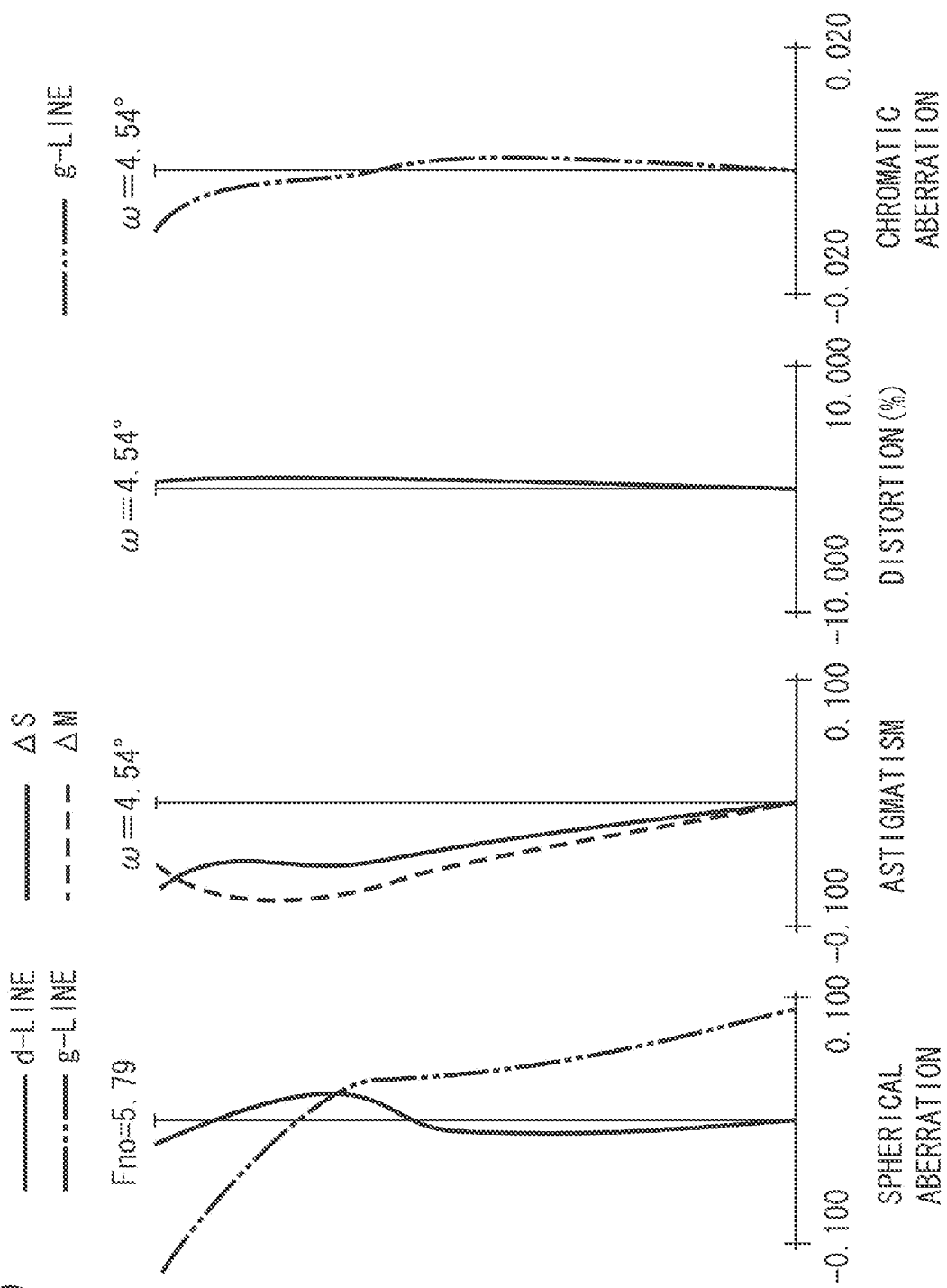

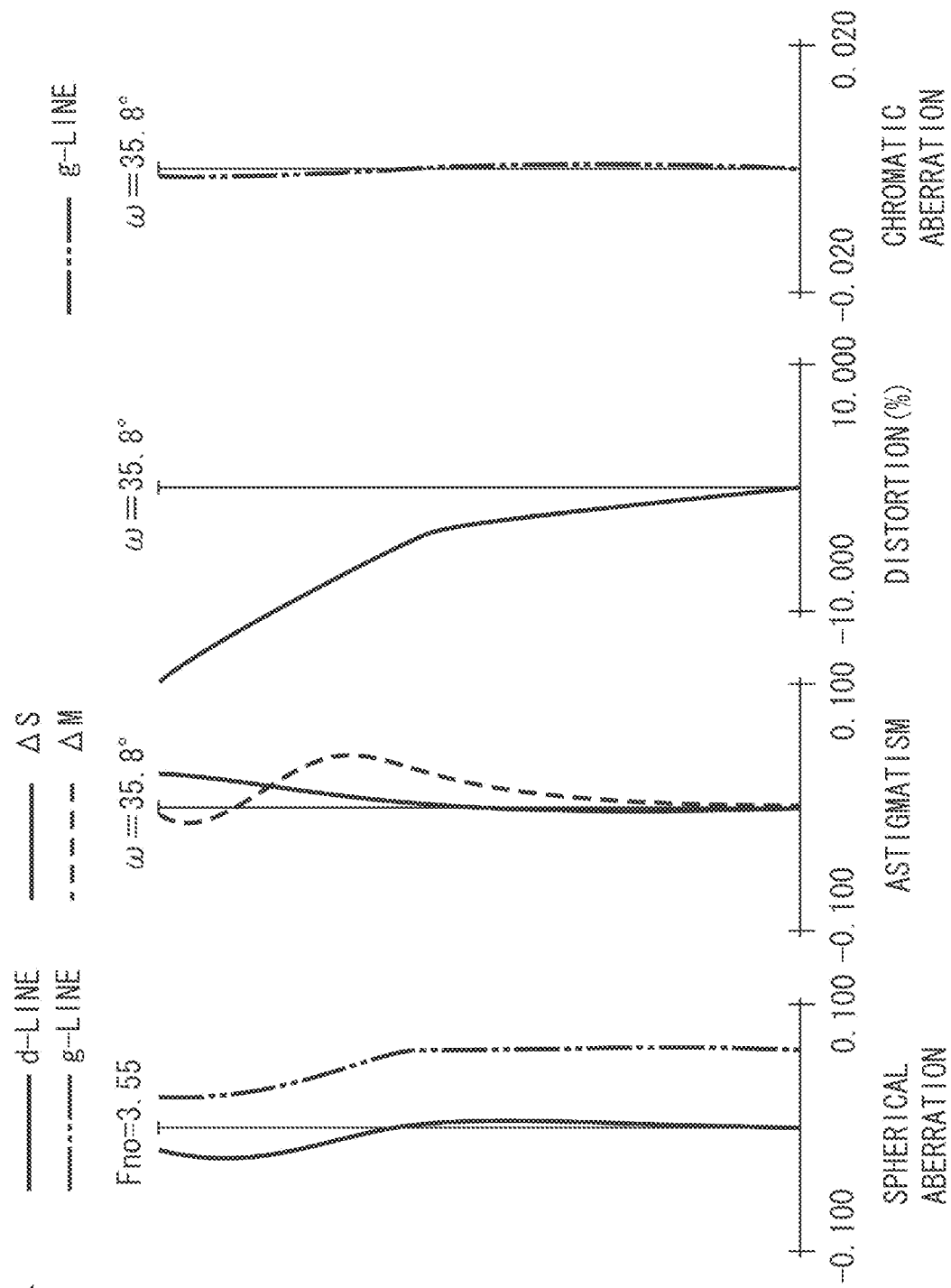

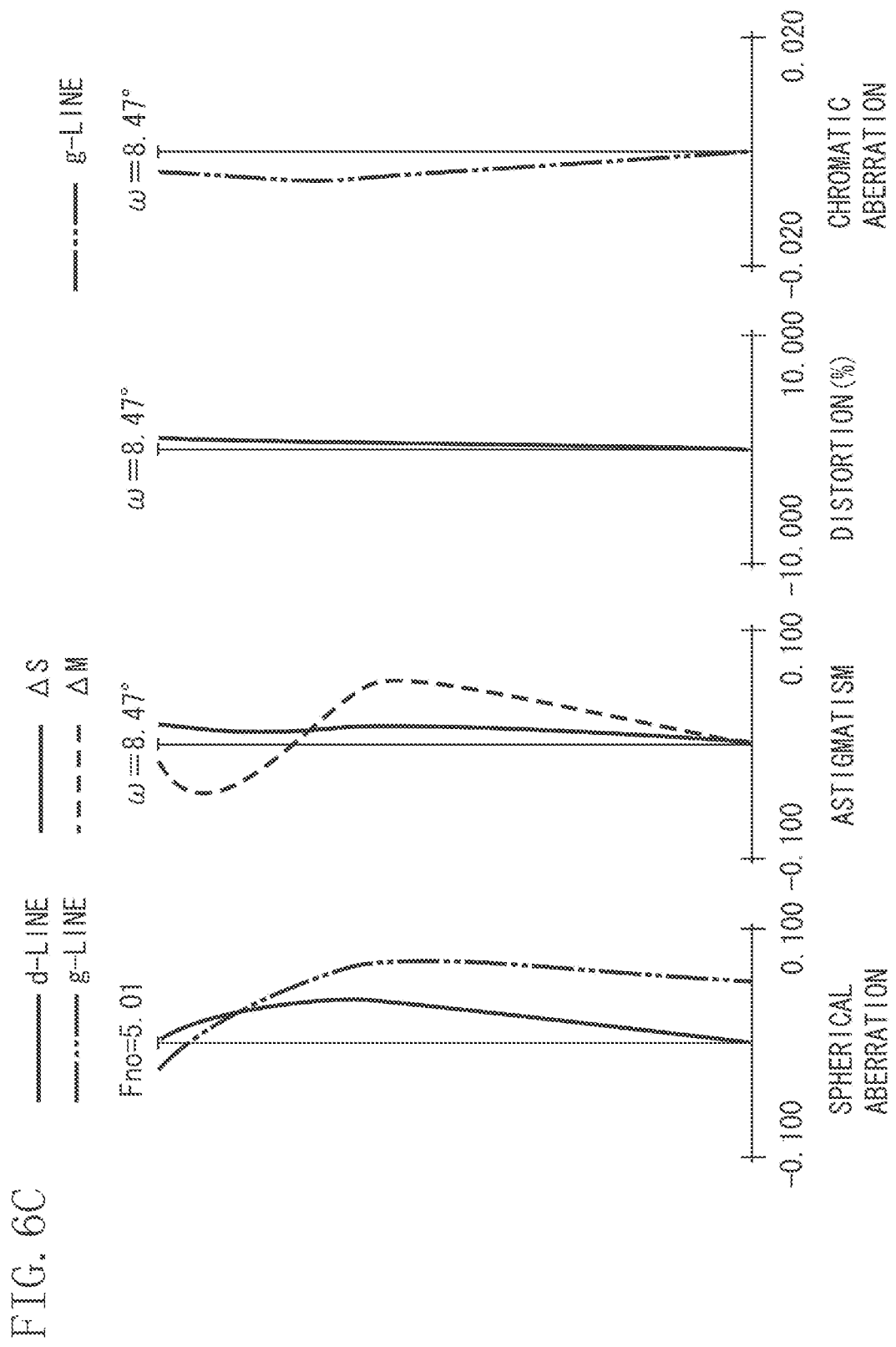

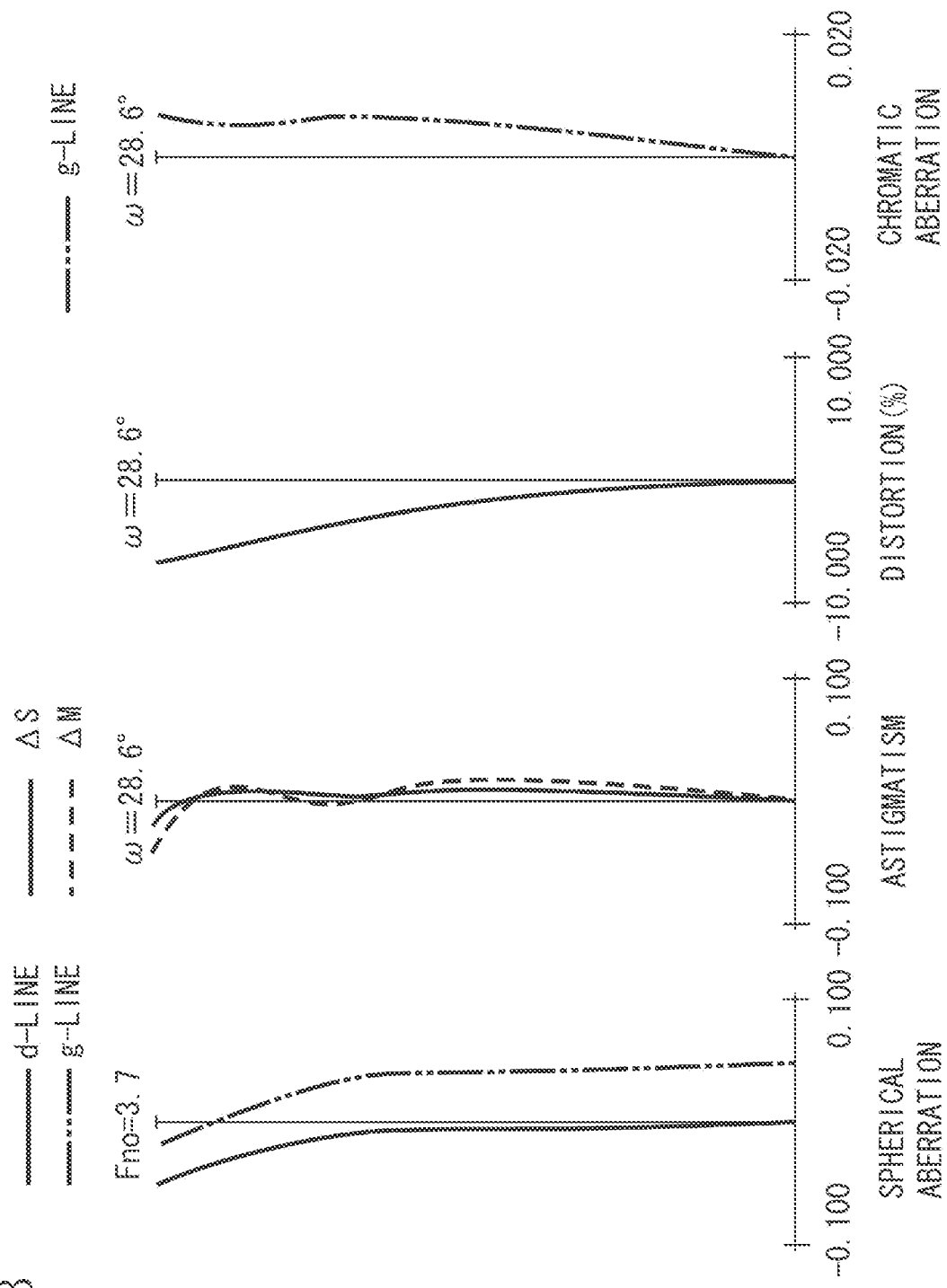

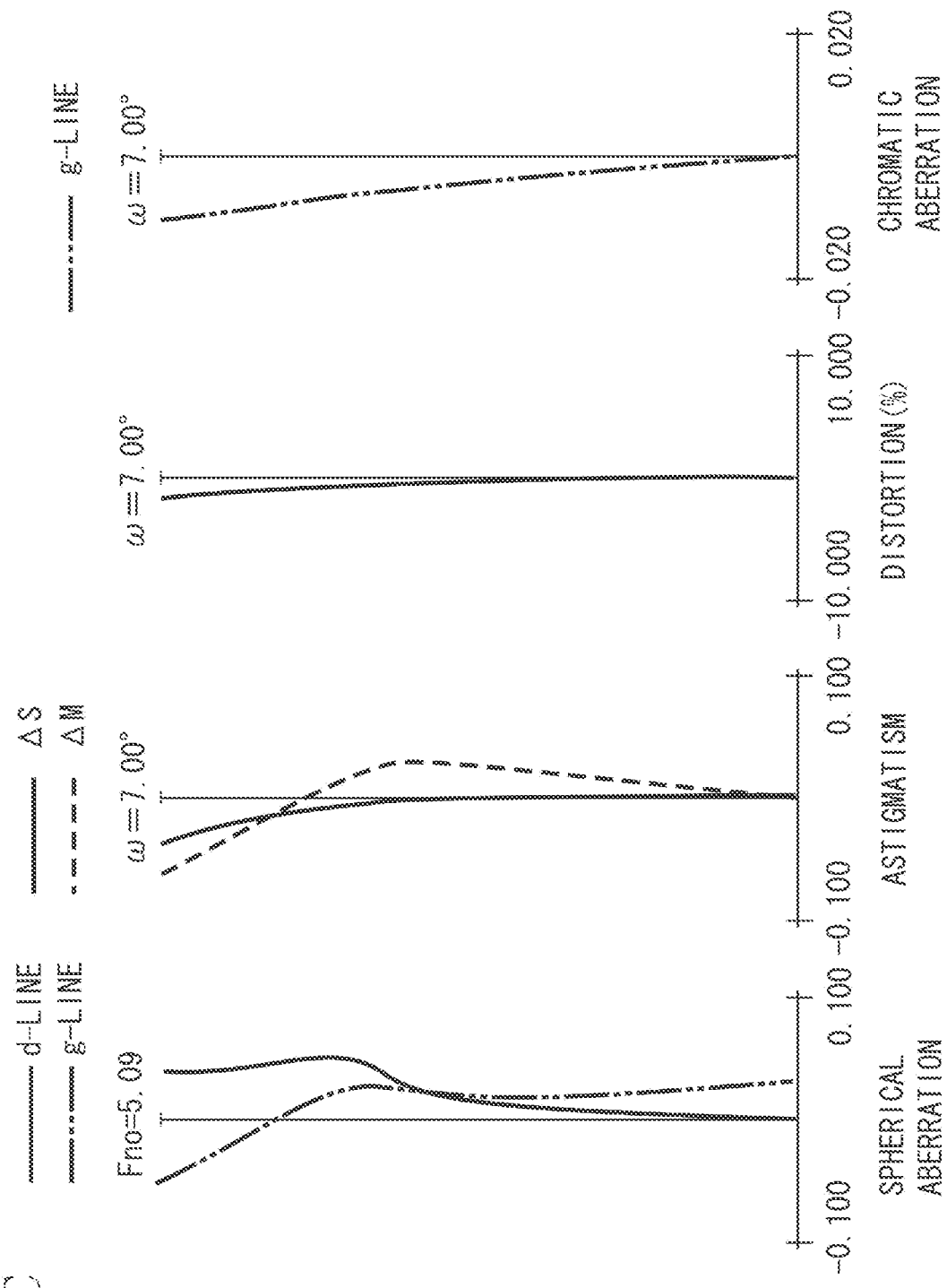

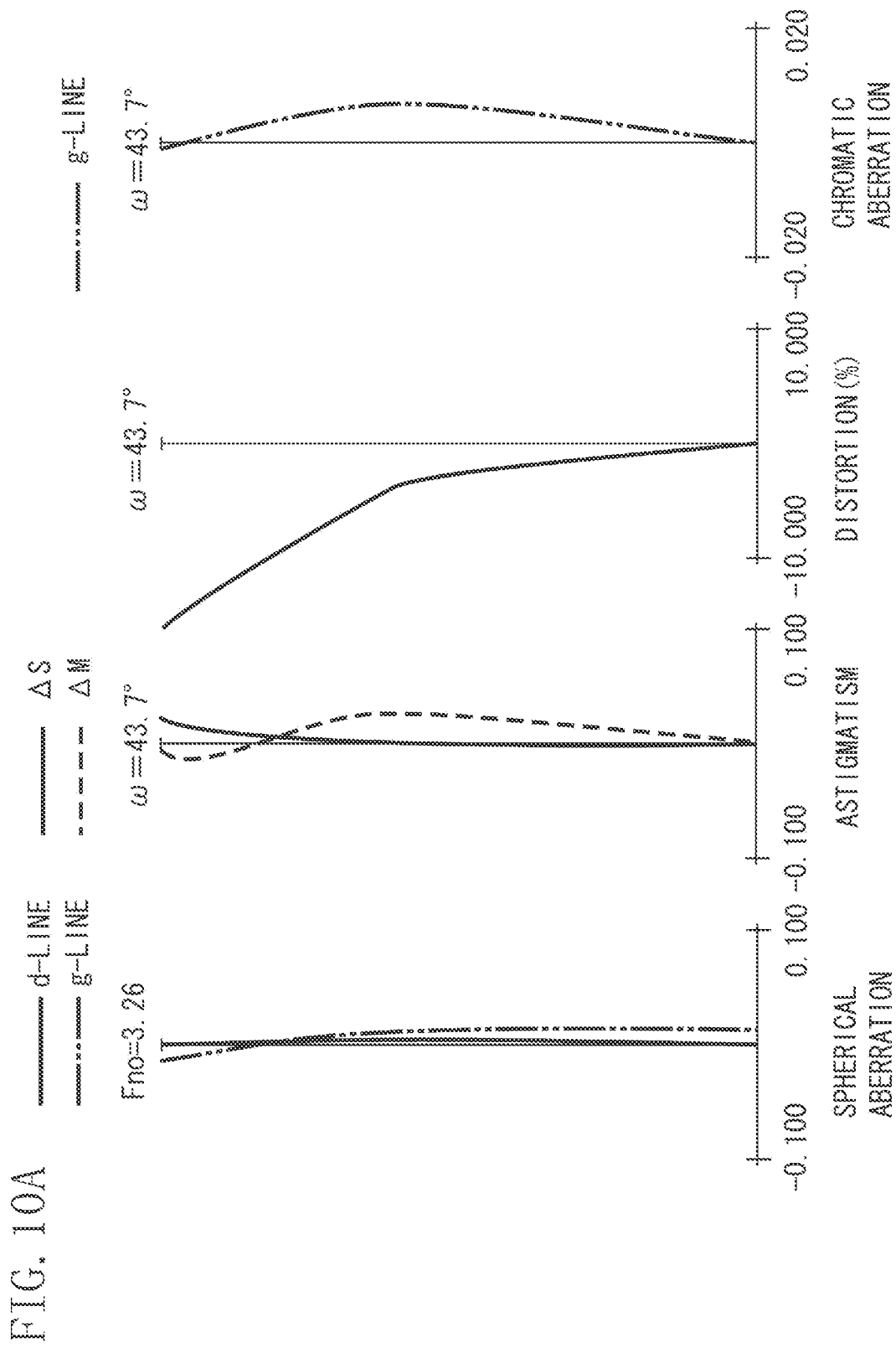

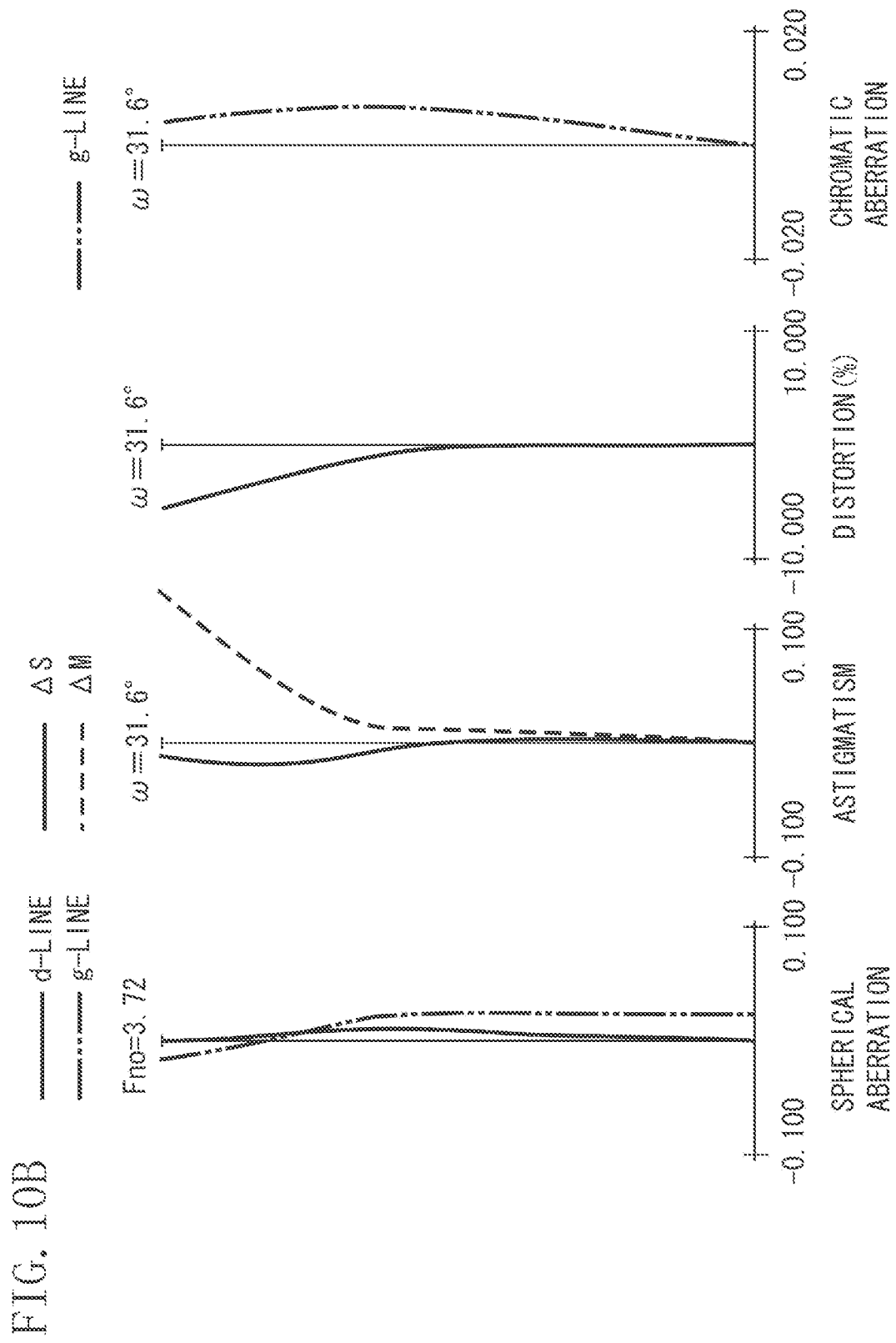

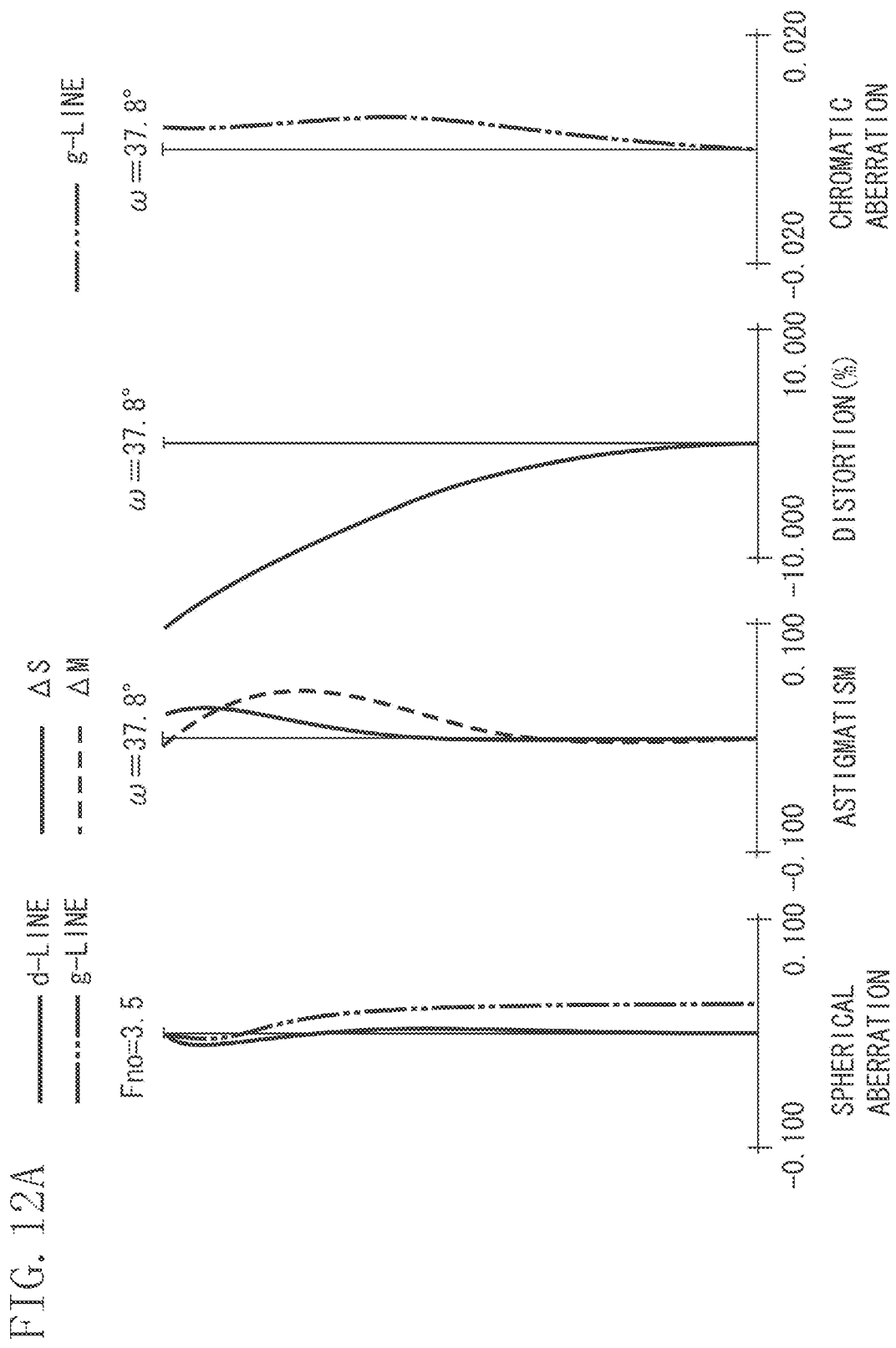

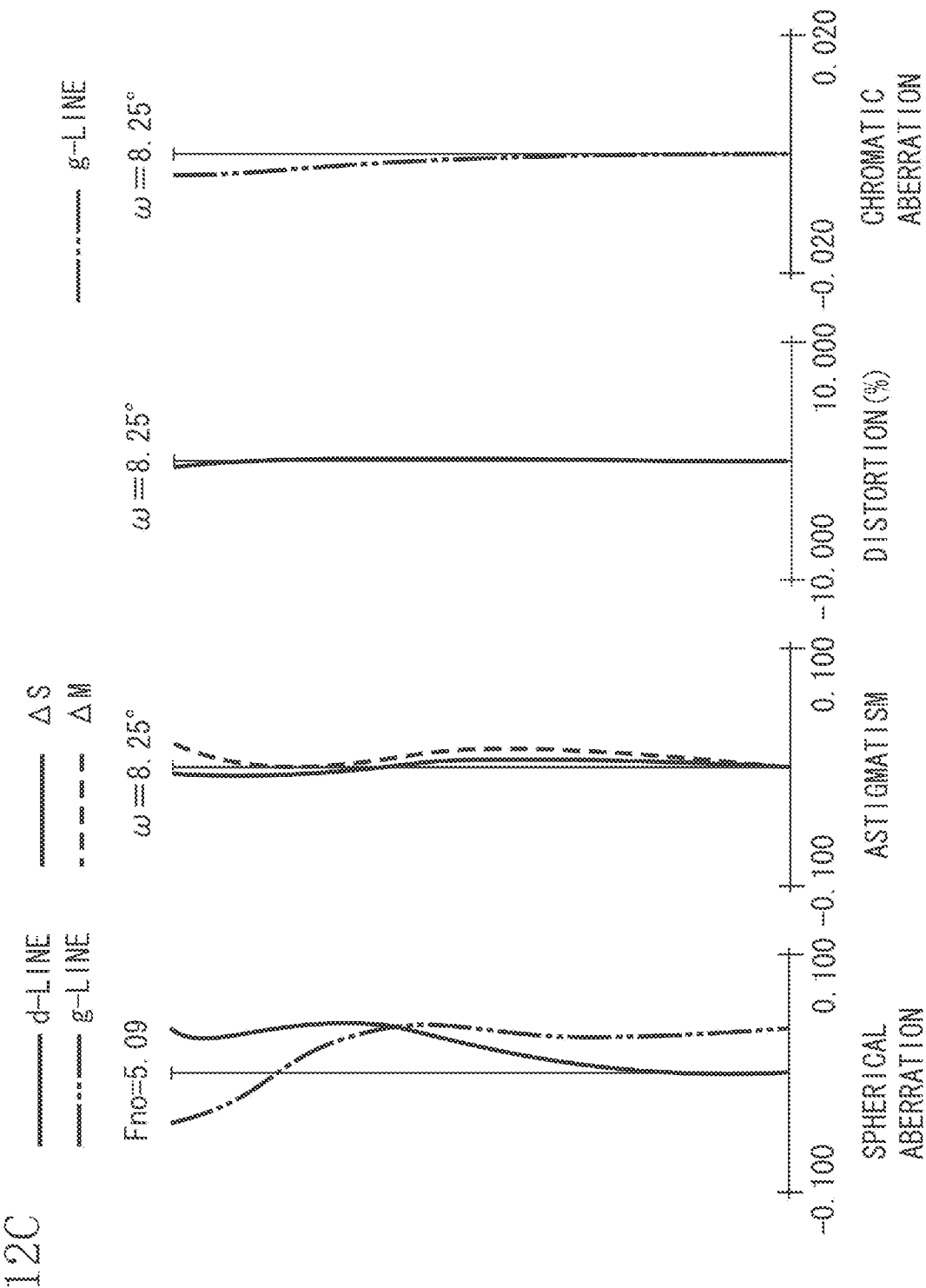

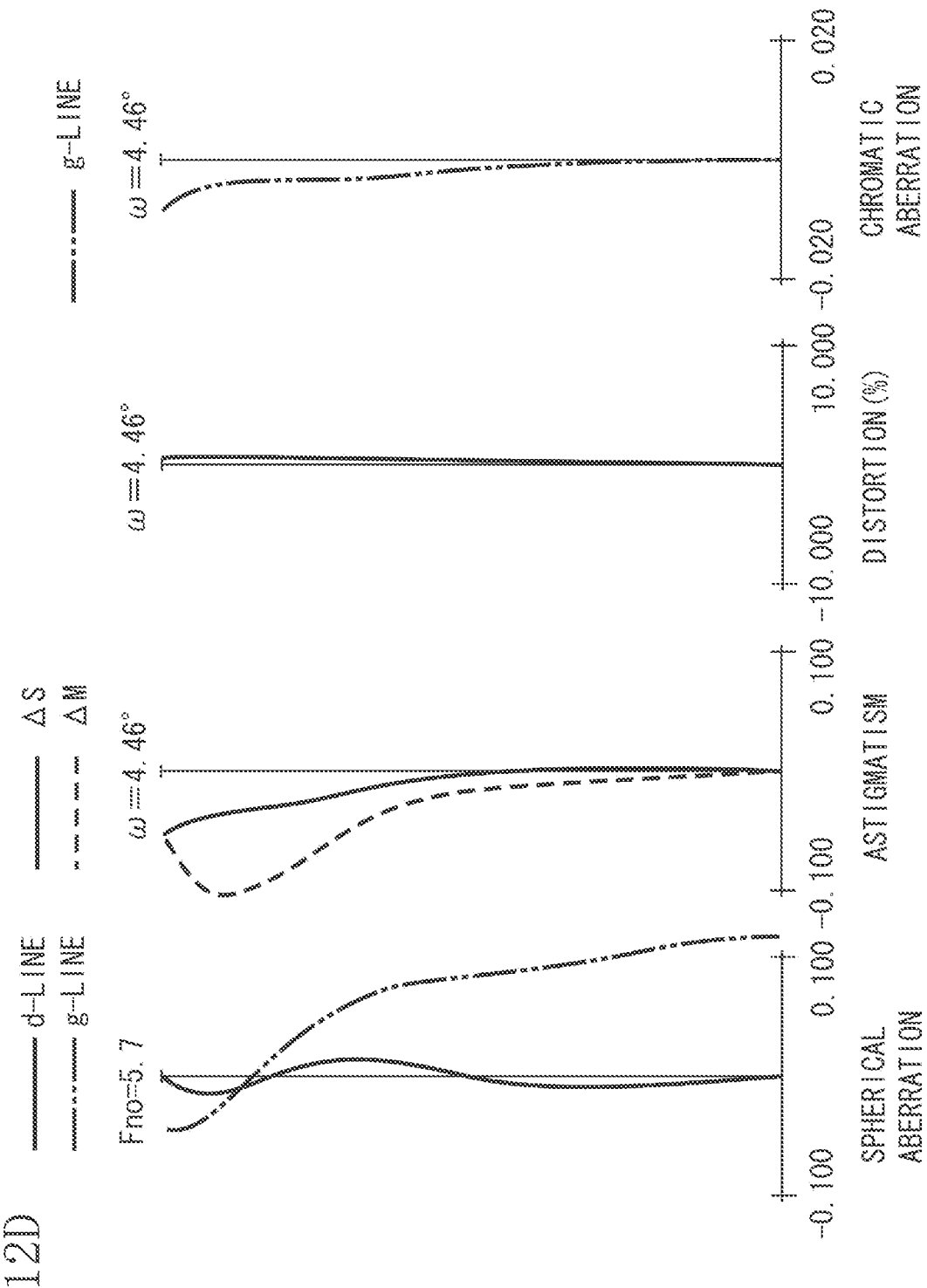

ZOOM LENS AND IMAGE PICKUP APPARATUS EQUIPPED WITH THE SAME

BACKGROUND OF THE INVENTION

1. Field of the Invention

The present invention relates to a zoom lens and an image pickup apparatus equipped with the same, and is applicable to an image pickup apparatus which uses a solid-state image sensor, such as a video camera, an electronic still camera, a TV camera, and a monitoring camera, or is applicable to a silver-halide film camera.

2. Description of the Related Art

As a photographic optical system used for an image pickup apparatus, there is required a zoom lens that has a short and compact total lens length, a high zoom ratio, and a high resolution.

A positive-lead type zoom lens is known. In the positive-lead type zoom lens, a lens unit having positive refractive power is arranged on an object side. As the positive-lead type zoom lens, a four-unit zoom lens is known. The four-unit zoom lens includes, in order from an object side to an image side, a first lens unit having positive refractive power, a second lens unit having negative refractive power, a third lens unit having positive refractive power, and a fourth lens unit having positive refractive power.

In order to reduce a size of the entire zoom lens and achieve high resolution, a zoom lens is required to perform excellent chromatic aberration correction. That is, a zoom lens is required to effectively correct chromatic aberrations, such as axial chromatic aberration and chromatic aberration of magnification. In order to reduce a variation in axial chromatic aberration and chromatic aberration of magnification during zooming, each lens unit of the zoom lens is required to independently perform chromatic aberration correction. Therefore, in many zoom lenses, each lens unit includes one or more lenses among positive lens and negative lenses made of different materials.

The four-unit zoom lens described above includes first, second and third lens units, each of which is provided with two lenses, that is, a single positive lens and a single negative lens, which are minimally necessary for chromatic aberration correction, and a fourth lens unit, which has a small variable magnification sharing and is provided with a single positive lens.

In U.S. Pat. No. 5,859,729 and U.S. Pat. No. 7,764,438, all lens units move during zooming. U.S. Pat. No. 5,859,729 discusses a zoom lens having a zoom ratio of about 2, and U.S. Pat. No. 7,764,438 discusses a zoom lens having a zoom ratio of about 5. U.S. Pat. No. 6,185,048 discusses a zoom lens having a zoom ratio of about 3, in which a first lens unit is stationary and second, third and fourth lens units move during zooming.

In the four-unit zoom lens including the lens units having the above-described refractive power arrangement, the variable magnification is efficiently performed by moving the lens units in such a manner that a distance between the second lens unit and the third lens unit becomes maximum at a wide-angle end and becomes minimum at a telephoto end. Also, the reduction in the size of the entire zoom lens is achieved by configuring each lens unit with two or less lenses. In the zoom lens of this zoom type, if trying to achieve a high zoom ratio of 5 or more, a great variation occurs in chromatic aberrations such as axial chromatic aberration and chromatic aberration of magnification during zooming.

In the four-unit zoom lens described above, it is important to appropriately set the lens configuration of the respective lens units to achieve a high zoom ratio, reduce a variation in chromatic aberrations during zooming, and obtain superior optical performance over the entire zoom range. For example, it is important to appropriately set the number of lenses of each lens unit, refractive power of each lens unit, and an amount of movement of each lens unit during zooming. In particular, unless the lens configuration of the first, second and third lens units is appropriately set, a variation in chromatic aberration increases during zooming. Therefore, it is difficult to obtain superior optical performance.

SUMMARY OF THE INVENTION

An embodiment of the present invention is directed to a zoom lens, which reduces a size of the entire zoom lens, has a high zoom ratio, and has superior optical performance over an entire zoom range, and an image pickup apparatus including the zoom lens.

According to an aspect of the present invention, a zoom lens includes, in order from an object side to an image side, a first lens unit having positive refractive power, a second lens unit having negative refractive power, a third lens unit having positive refractive power, and a fourth lens unit having positive refractive power, wherein, during zooming from a wide-angle end to a telephoto end, each lens unit moves in such a manner that a distance between the first lens unit and the second lens unit increases, and a distance between the second lens unit and the third lens unit decreases, wherein each of the first lens unit, the second lens unit, and the third lens unit consists of a single positive lens and a single negative lens, and the fourth lens unit consists of a single positive lens, and wherein the following conditions are satisfied:

$$6.0 < f1/fw < 20.0$$

$$0.05 < |f2|/ft < 0.40$$

where fw and ft are focal lengths of the entire zoom lens at the wide-angle end and the telephoto end, respectively, and f1 and f2 are focal lengths of the first lens unit and the second lens unit, respectively.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, 2C, and 2D are aberration diagrams of the zoom lens at the wide-end end, a first middle zoom position, a second middle zoom position, and the telephoto end, respectively, according to the first exemplary embodiment.

FIG. 3 is a lens sectional view of a zoom lens at the wide-angle end according to a second exemplary embodiment of the present invention.

FIGS. 4A, 4B, 4C, and 4D are aberration diagrams of the zoom lens at the wide-angle end, a first middle zoom position, a second middle zoom position, and the telephoto end, respectively, according to the second exemplary embodiment.

FIGS. 6A, 6B, 6C, and 6D are aberration diagrams of the zoom lens at the wide-angle end, a first middle zoom position, a second middle zoom position, and the telephoto end, respectively, according to the third exemplary embodiment.

FIGS. 8A, 8B, 8C, and 8D are aberration diagrams of the zoom lens at the wide-angle end, a first middle zoom position, a second middle zoom position, and the telephoto end, respectively, according to the fourth exemplary embodiment.

FIGS. 10A, 10B, 10C, and 10D are aberration diagrams of the zoom lens at the wide-angle end, a first middle zoom position, a second middle zoom position, and the telephoto end, respectively, according to the fifth exemplary embodiment.

FIGS. 12A, 12B, 12C, and 12D are aberration diagrams of the zoom lens at the wide-angle end, a first middle zoom position, a second middle zoom position, and the telephoto end, respectively, according to the sixth exemplary embodiment.

DESCRIPTION OF THE EMBODIMENTS

Various exemplary embodiments, features, and aspects of the invention will be described in detail below with reference to the drawings.

Hereinafter, a zoom lens and an image pickup apparatus including the same according to exemplary embodiments of the present invention will be described.

A zoom lens according to an exemplary embodiment of the present invention includes, in order from an object side to an image side, a first lens unit having positive refractive power, a second lens unit having negative refractive power, a third lens unit having positive refractive power, and a fourth lens unit having positive refractive power. During zooming from a wide-angle end to a telephoto end, each lens unit moves in such a manner that a distance between the first lens unit and the second lens unit increases, a distance between the second lens unit and the third lens unit decreases, and a distance between the third lens unit and the fourth lens unit increases. Each of the first lens unit, the second lens unit, and the third lens unit consists of a single positive lens and a single negative lens, and the fourth lens unit consists of a single positive lens.

Figure 1:
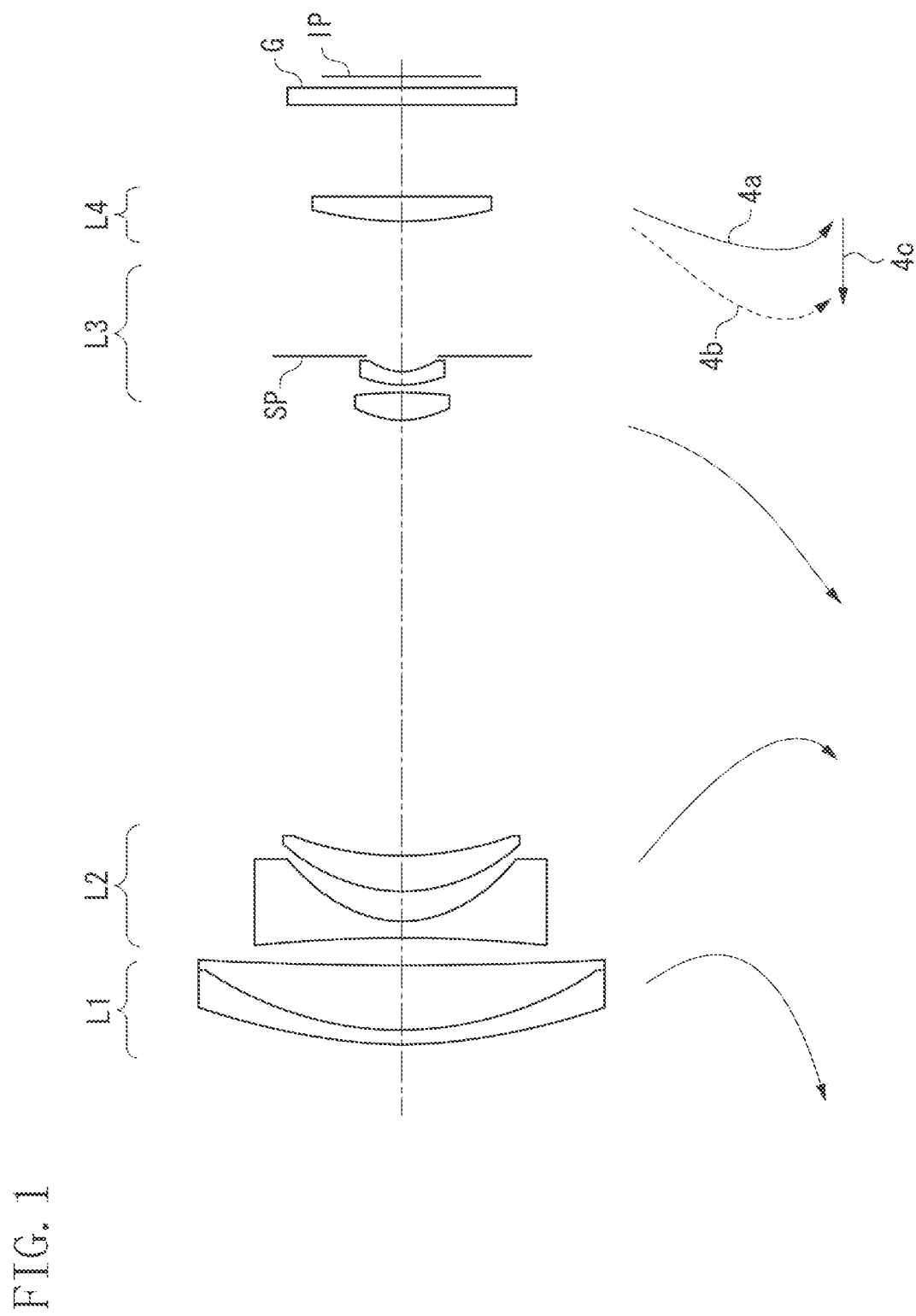
FIG. 1 is a lens sectional view of a zoom lens at the wide-angle end according to a first exemplary embodiment of the present invention.
Figure 4A:
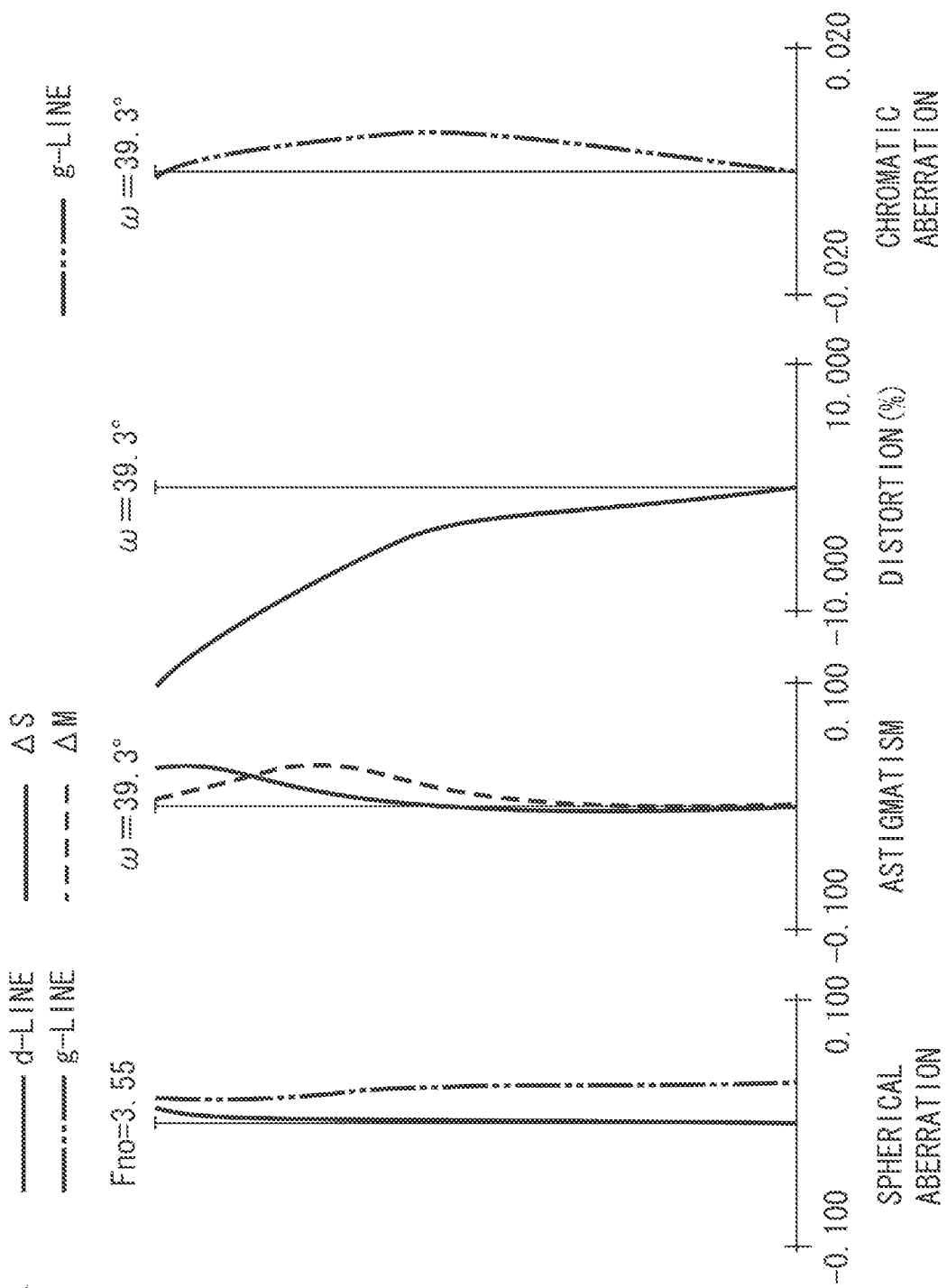
Figure 4B:
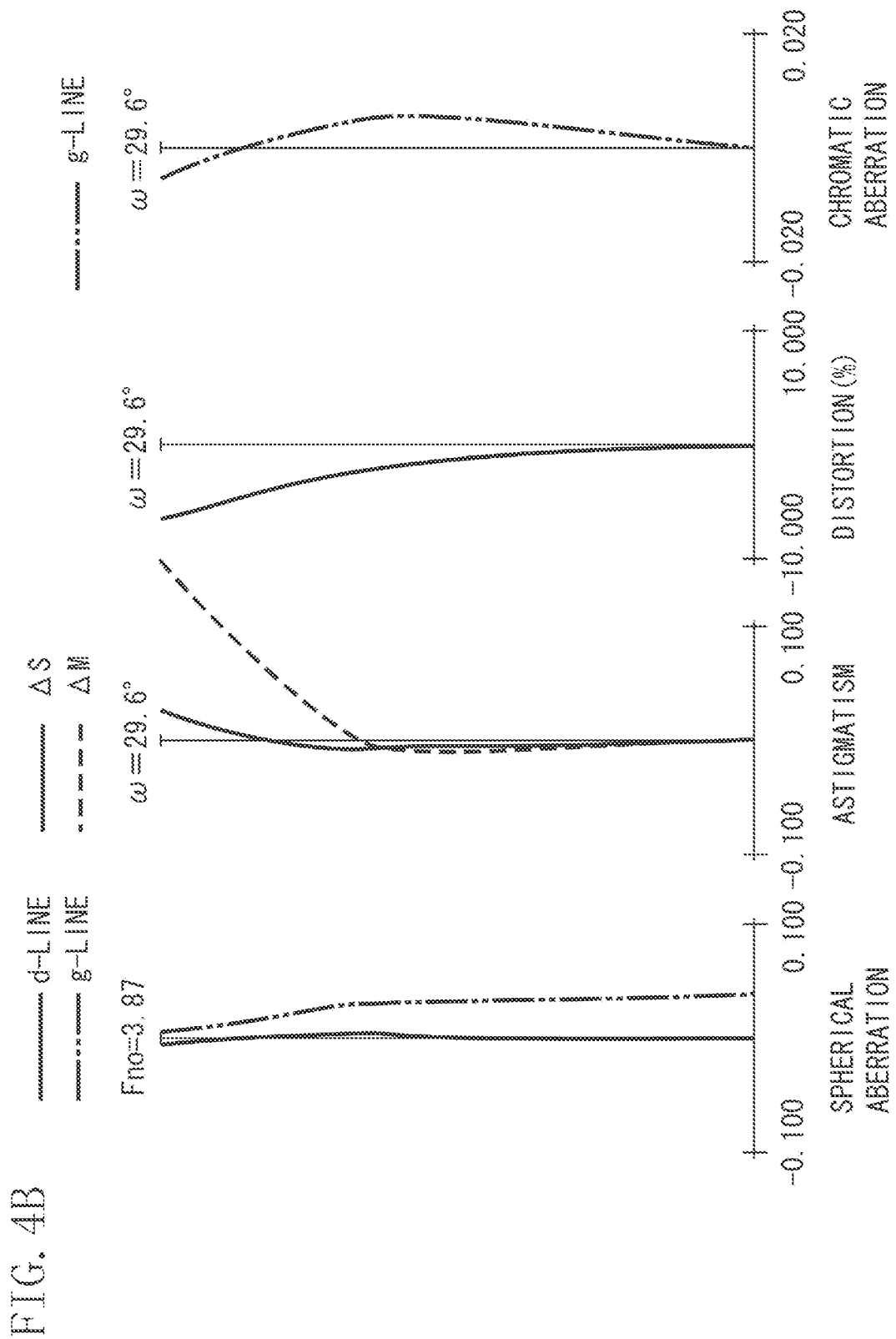
Figure 4C:
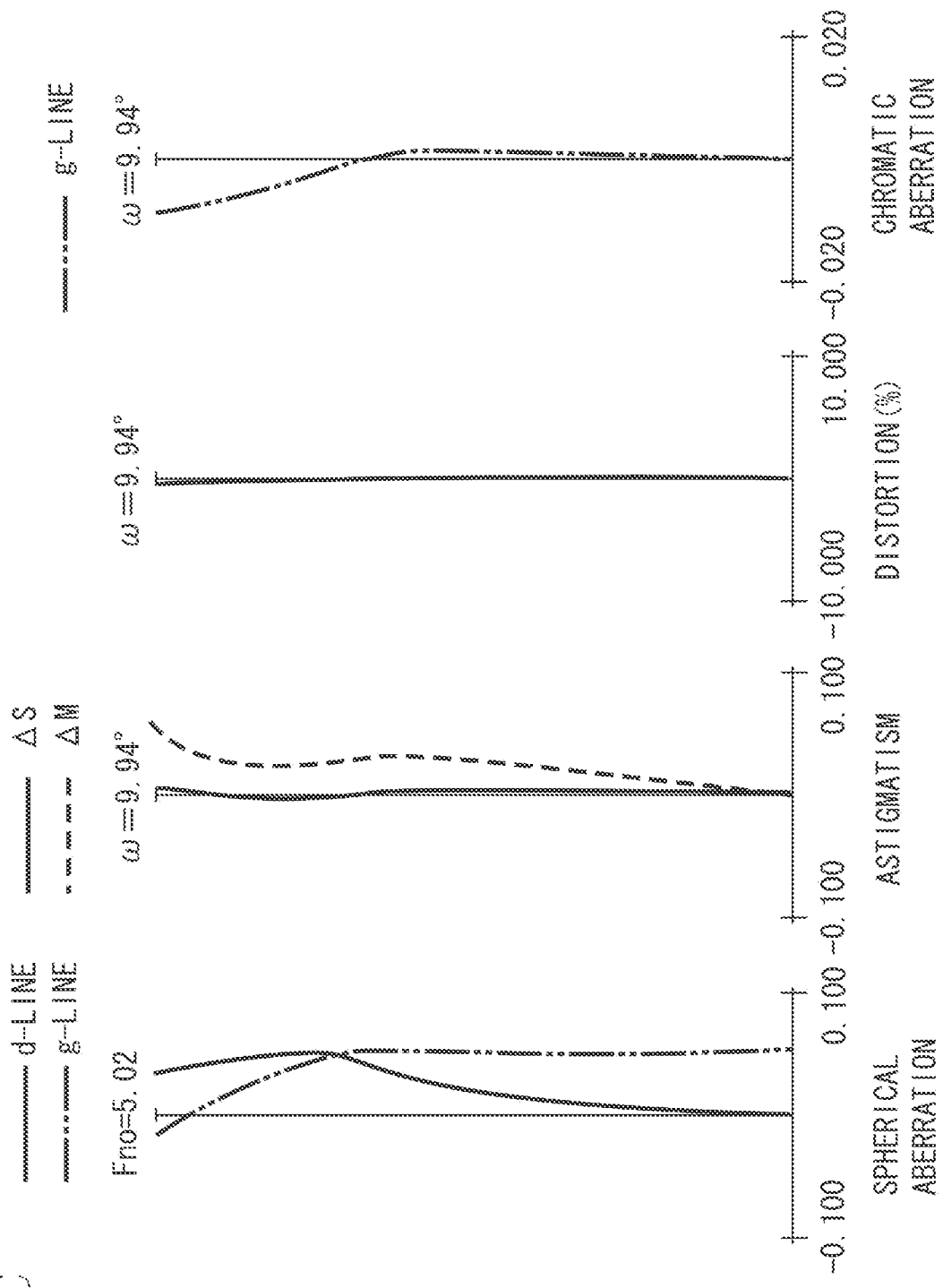

FIG. 1 is a lens sectional view of a zoom lens at the wide-angle end (short focal length end) according to a first exemplary embodiment of the present invention. FIGS. 2A, 2B, 2C, and 2D are aberration diagrams of the zoom lens at the wide-angle end, a first middle zoom position, a second middle zoom position, and the telephoto end (long focal length end), respectively, according to the first exemplary embodiment. The first middle zoom position is a zoom position at which a focal length thereof is about 1.5 times a local length of the wide-angle end, and the second middle zoom position is a zoom position at which a focal length thereof is about 0.5 times a local length of the telephoto end.

Figure 5:
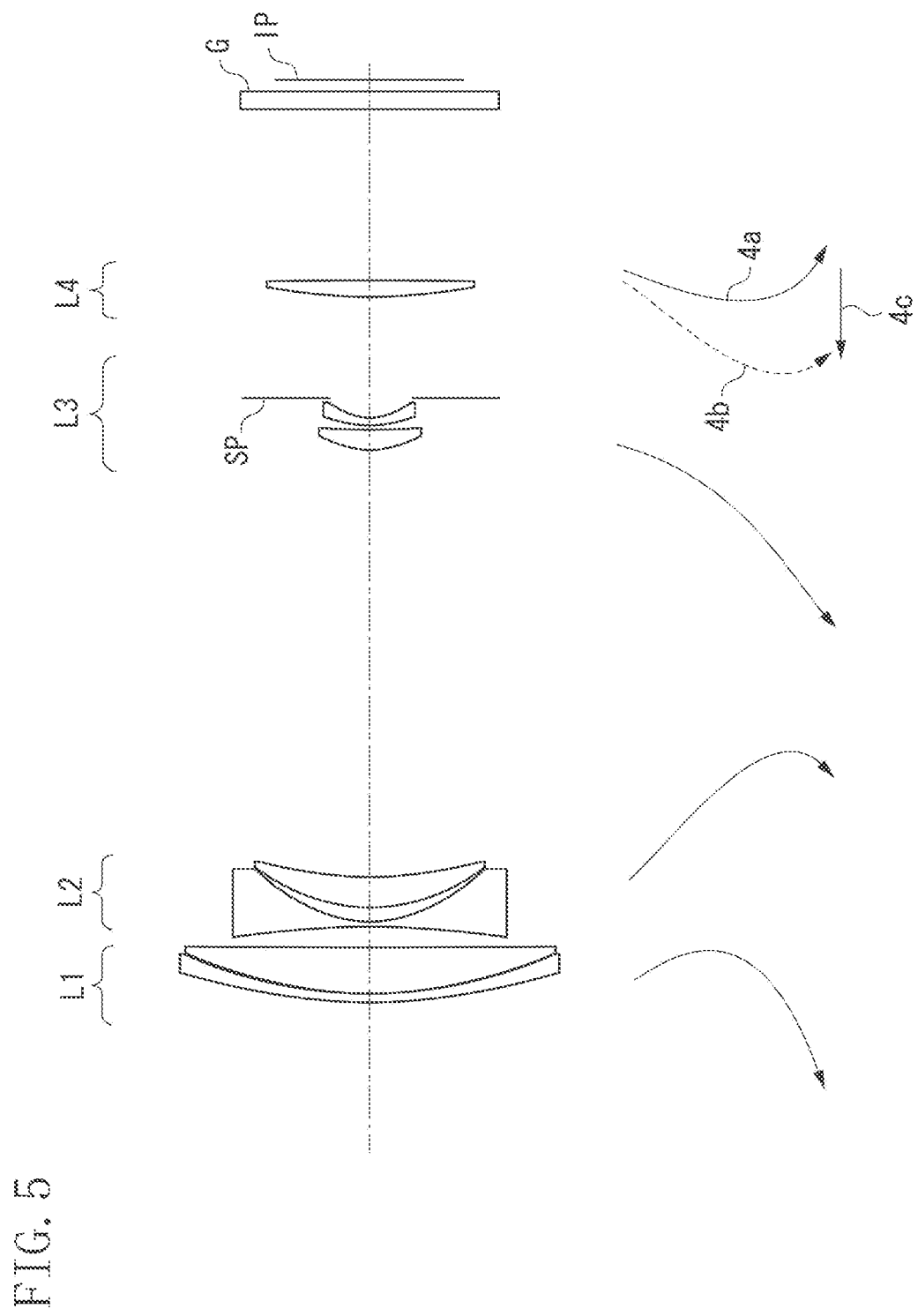
FIG. 5 is a lens sectional view of a zoom lens at the wide-angle end according to a third exemplary embodiment of the present invention.
Figure 6B:
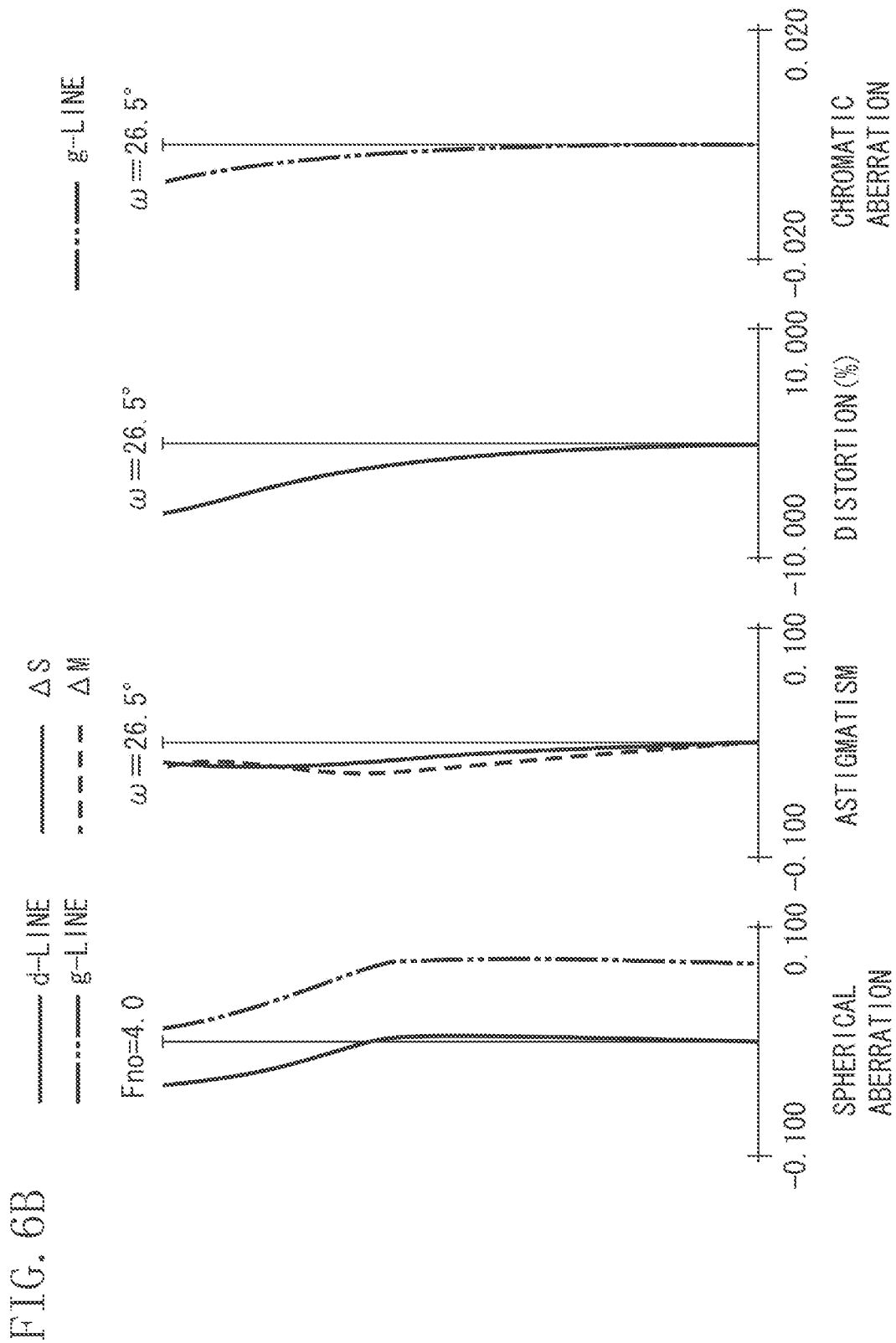
Figure 6D:
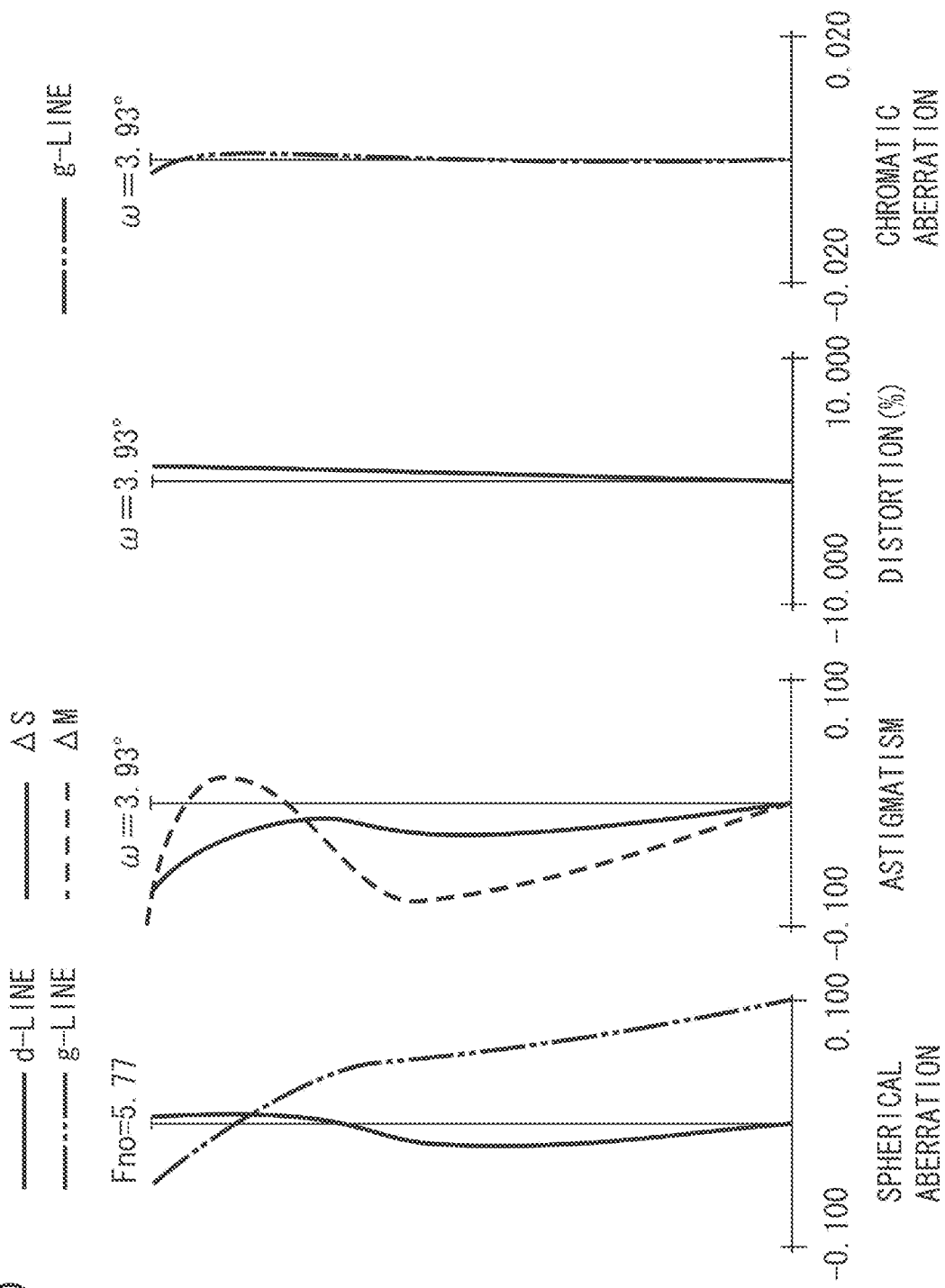

FIG. 3 is a lens sectional view of a zoom lens at the wide-angle end according to a second exemplary embodiment of the present invention. FIGS. 4A, 4B, 4C, and 4D are aberration diagrams of the zoom lens at the wide-angle end, a first middle zoom position, a second middle zoom position, and the telephoto end, respectively, according to the second exemplary embodiment. FIG. 5 is a lens sectional view of a zoom lens at the wide-angle end according to a third exemplary embodiment of the present invention. FIGS. 6A, 6B, 6C, and 6D are aberration diagrams of the zoom lens at the wide-angle end, a first middle zoom position, a second middle zoom position, and the telephoto end, respectively, according to the third exemplary embodiment.

Figure 7:
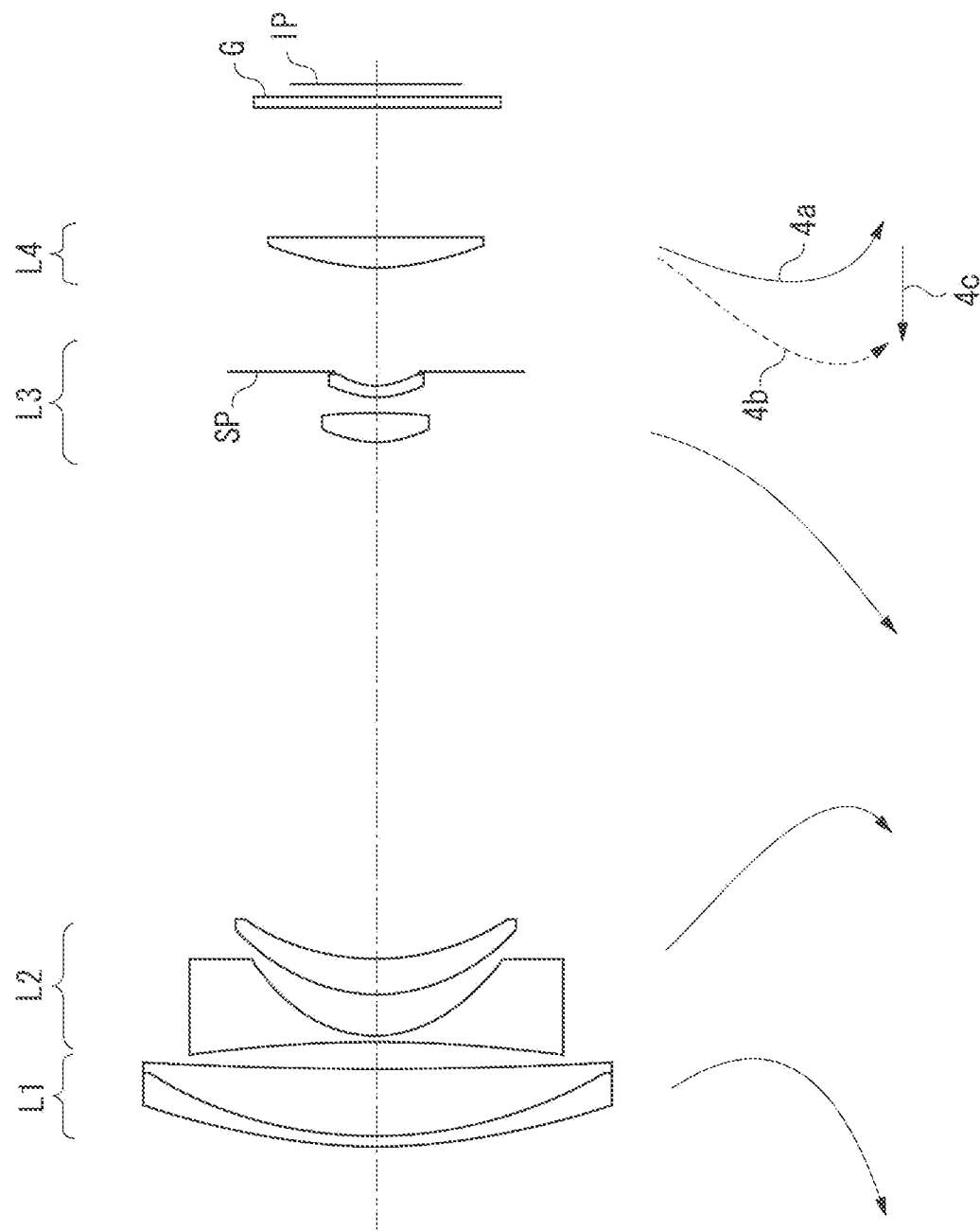
FIG. 7 is a lens sectional view of a zoom lens at the wide-angle end according to a fourth exemplary embodiment of the present invention.
Figure 8A:
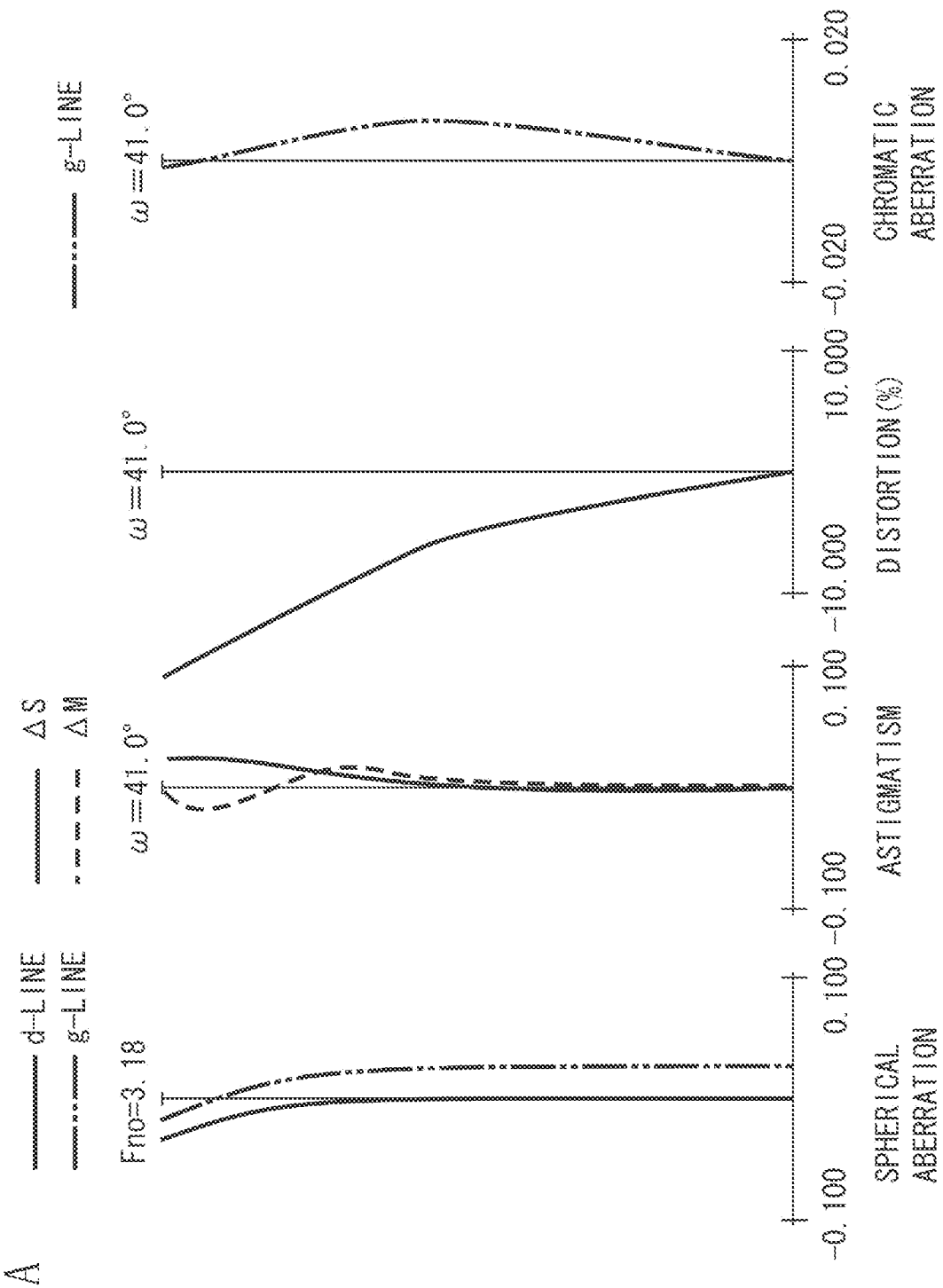
Figure 8D:
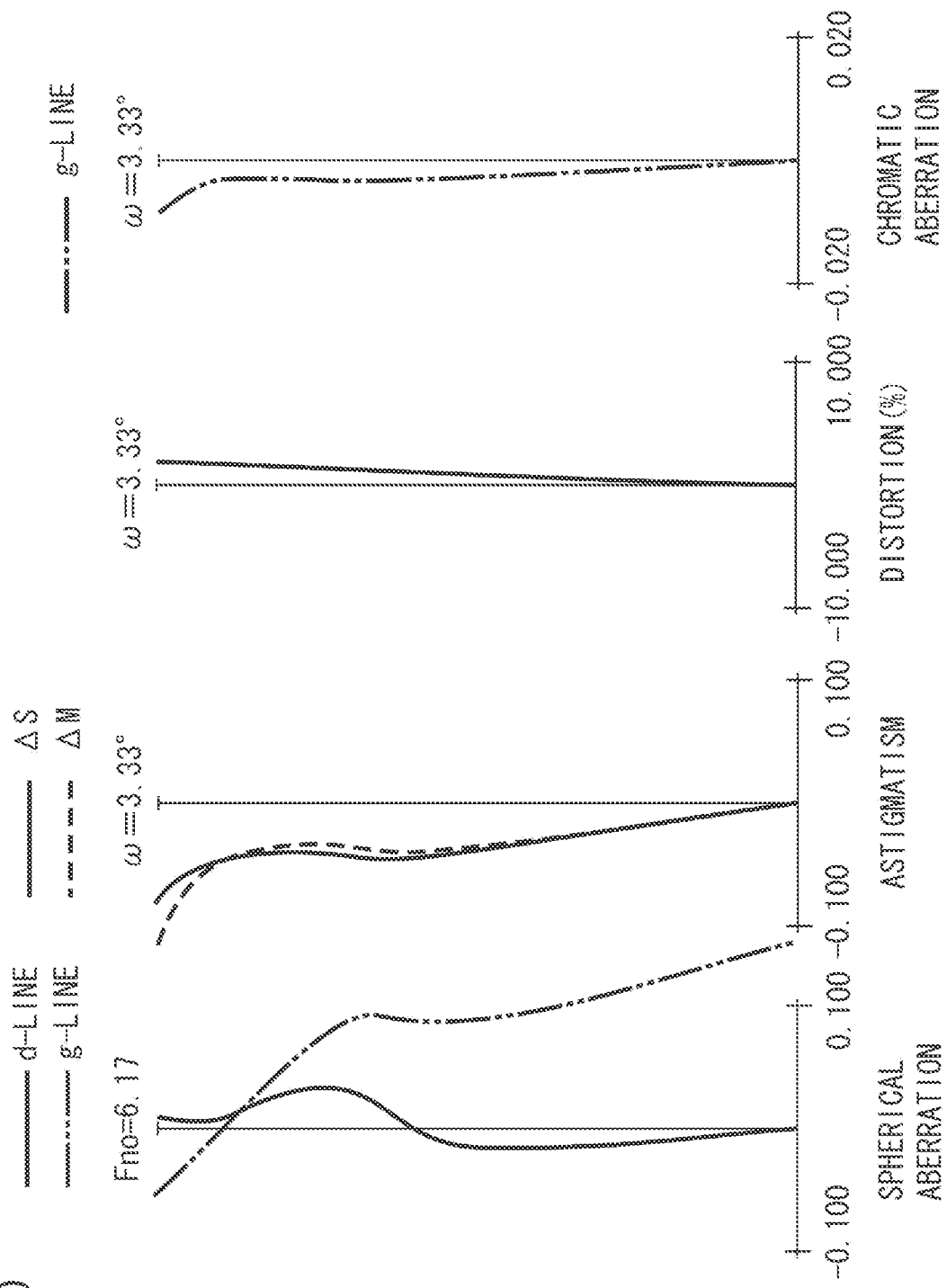
Figure 9:
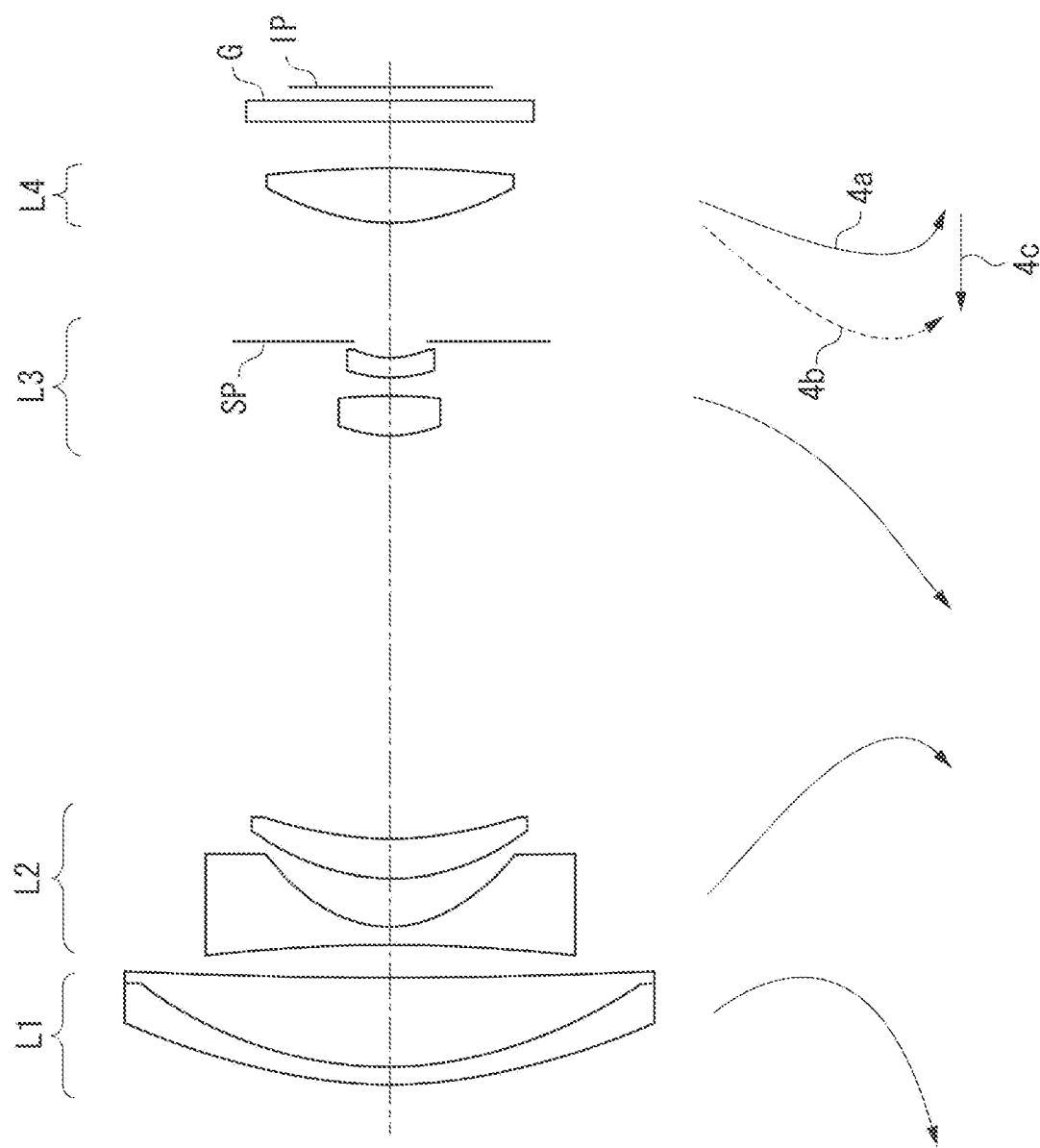
FIG. 9 is a lens sectional view of a zoom lens at the wide-angle end according to a fifth exemplary embodiment of the present invention.
Figure 10C:
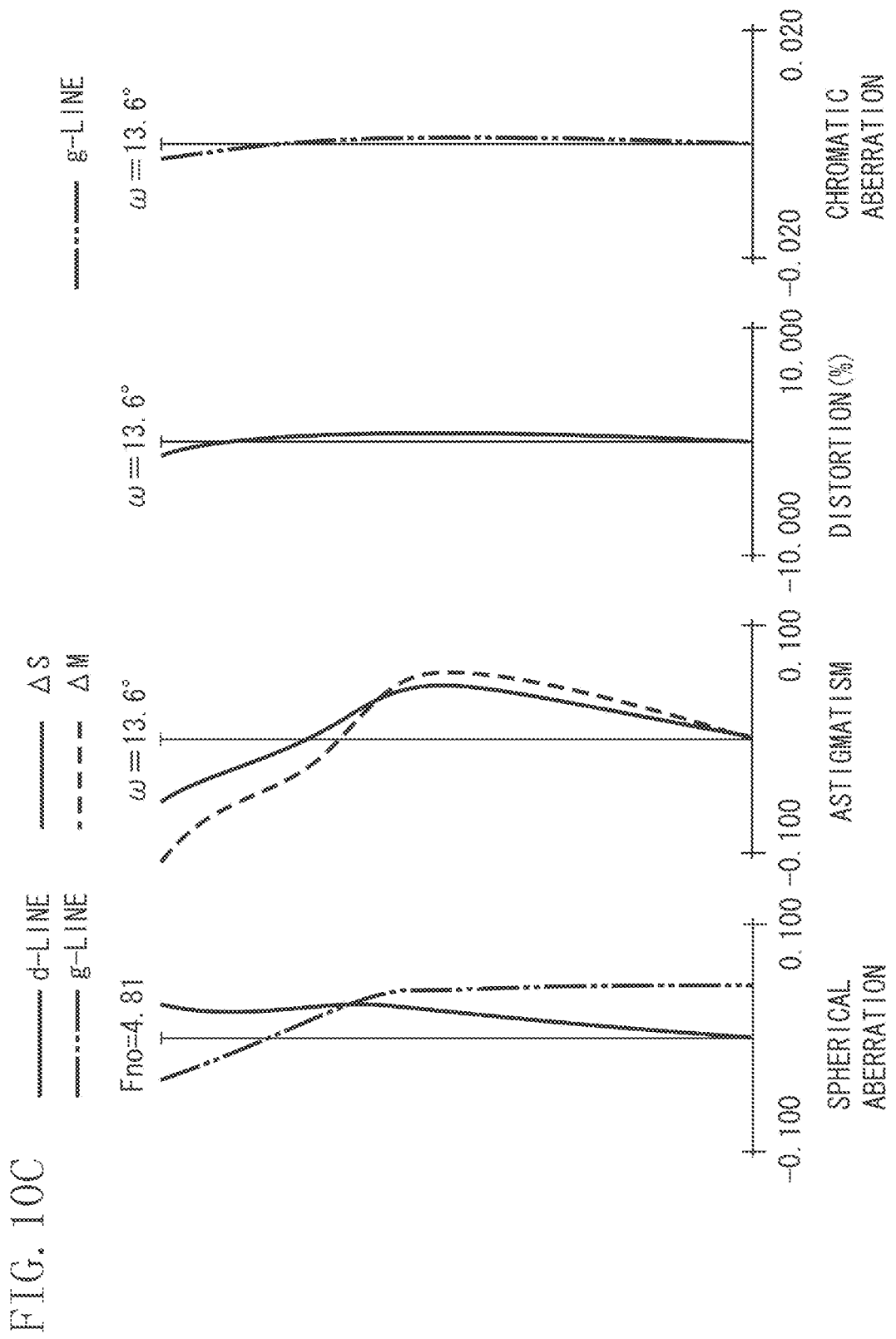
Figure 10D:
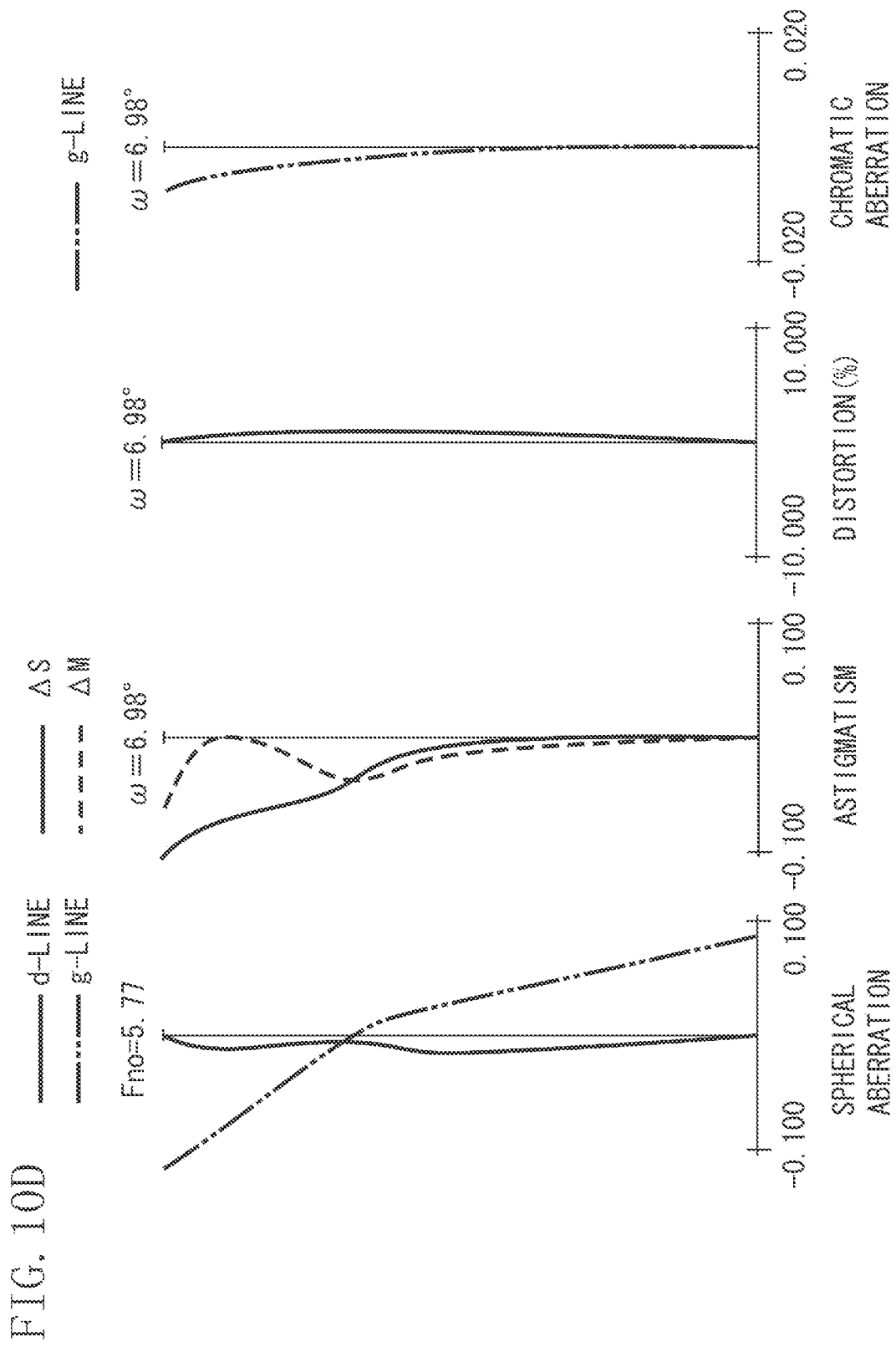

FIG. 7 is a lens sectional view of a zoom lens at the wide-angle end according to a fourth exemplary embodiment of the present invention. FIGS. 8A, 8B, 8C, and 8D are aberration diagrams of the zoom lens at the wide-angle end, a first middle zoom position, a second middle zoom position, and the telephoto end, respectively, according to the fourth exemplary embodiment. FIG. 9 is a lens sectional view of a zoom lens at the wide-angle end according to a fifth exemplary embodiment of the present invention. FIGS. 10A, 10B, 10C, and 10D are aberration diagrams of the zoom lens at the wide-angle end, a first middle zoom position, a second middle zoom position, and the telephoto end, respectively, according to the fifth exemplary embodiment.

Figure 11:
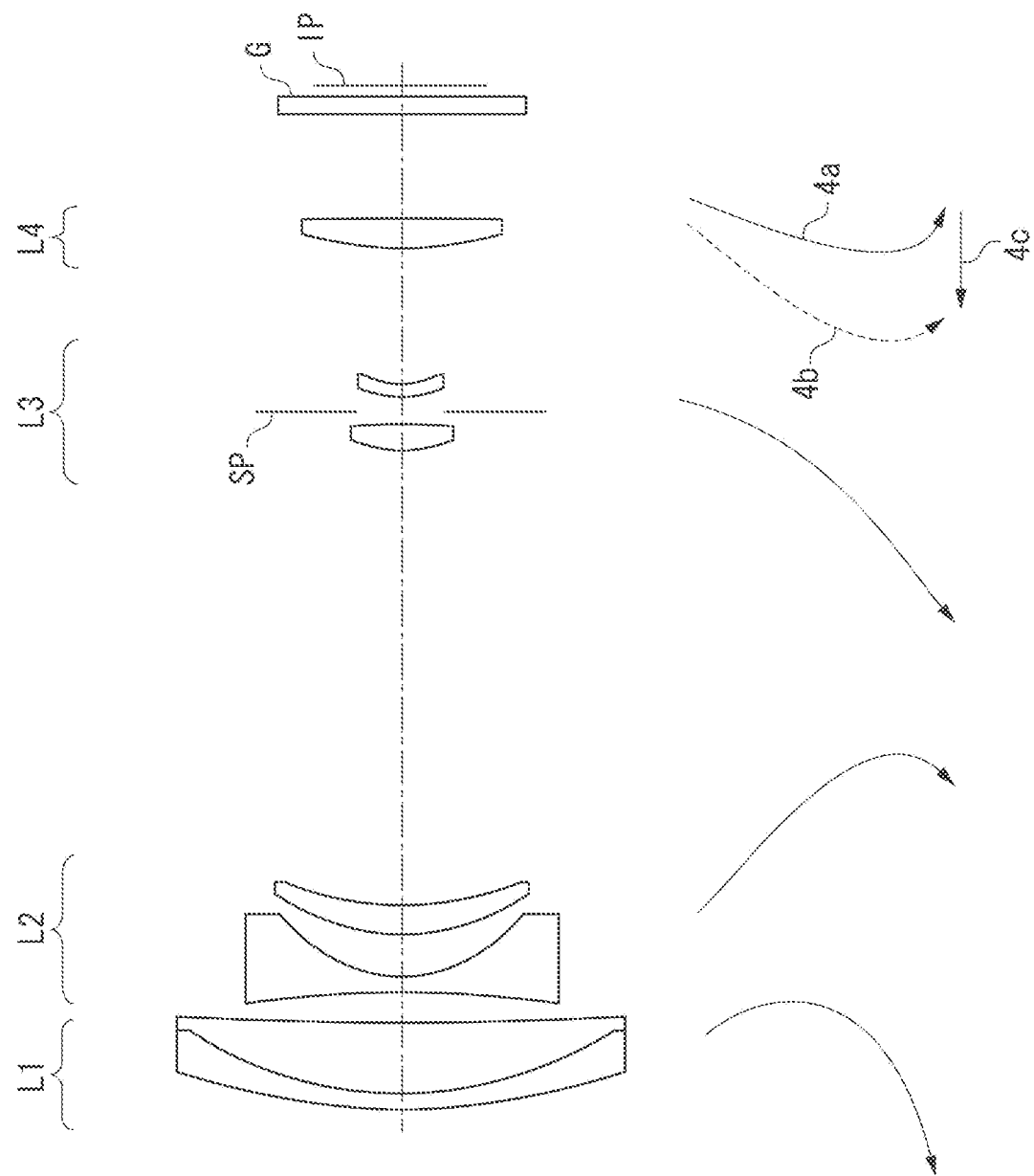
FIG. 11 is a lens sectional view of a zoom lens at the wide-angle end according to a sixth exemplary embodiment of the present invention.
Figure 12B:
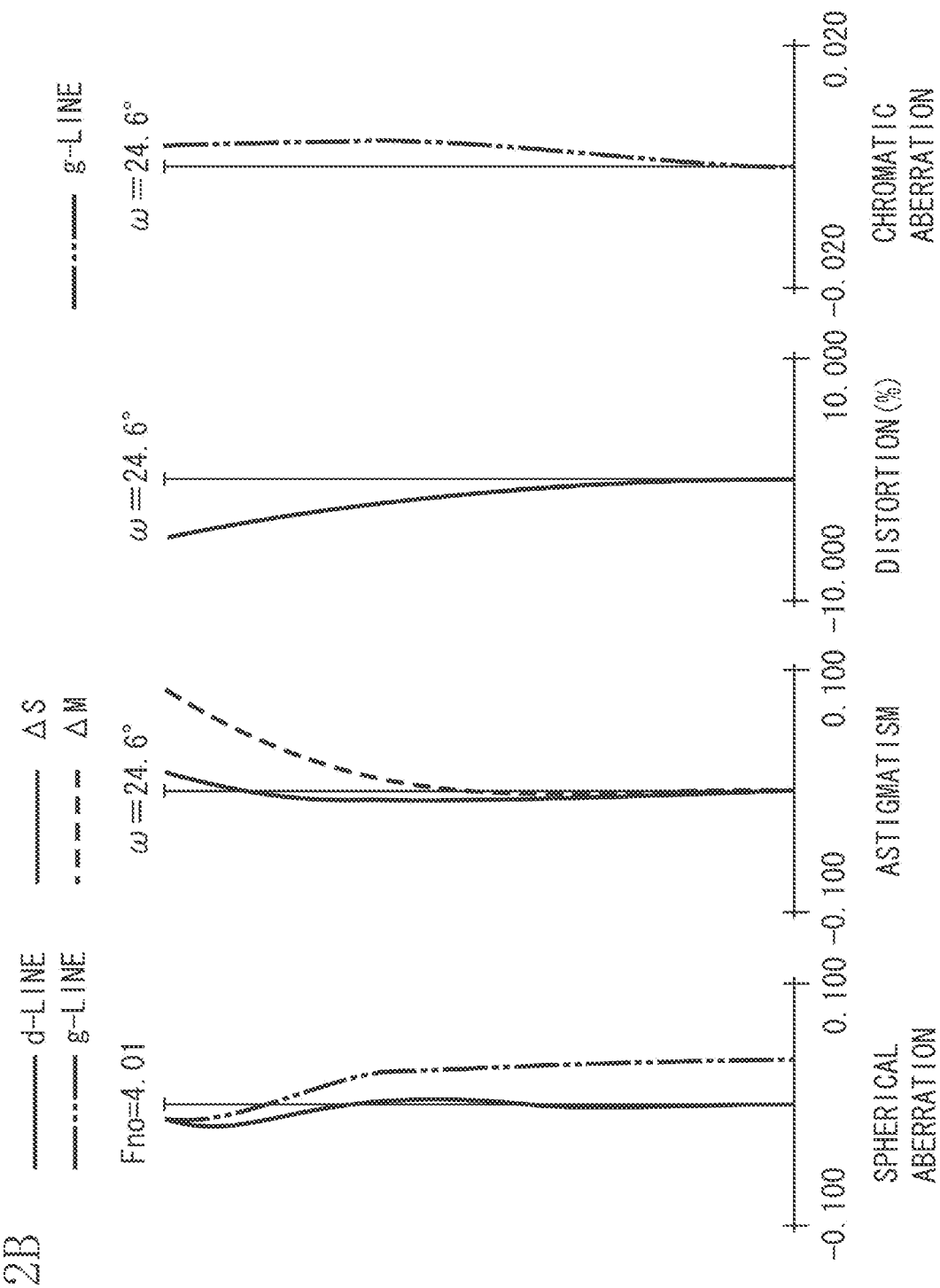
Figure 13:
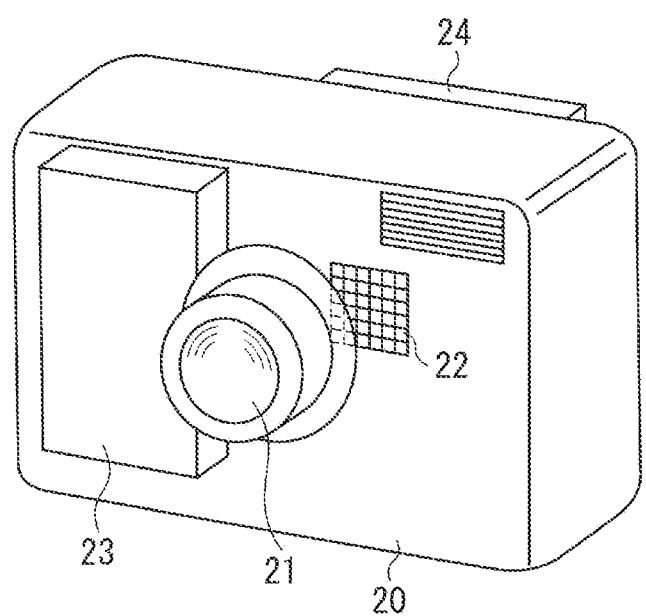
FIG. 13 is a schematic diagram illustrating principal portions of a digital camera when a zoom lens according to an exemplary embodiment of the present invention is applied to the digital camera.

FIG. 11 is a lens sectional view of a zoom lens at the wide-angle end according to a sixth exemplary embodiment of the present invention. FIGS. 12A, 12B, 12C, and 12D are aberration diagrams of the zoom lens at the wide-angle end, a first middle zoom position, a second middle zoom position, and the telephoto end, respectively, according to the sixth exemplary embodiment. FIG. 13 is a schematic diagram illustrating principal portions of a camera (image pickup apparatus) including the zoom lens according to the exemplary embodiment.

The zoom lens according to each exemplary embodiment is a photographic lens system used for an image pickup apparatus, such as a video camera or a digital camera. In each lens sectional view, the left side is an object side (front side), and the right side is an image side (rear side). In each lens sectional view, i denotes an order of the lens unit from the object side, and Li denotes an i-th lens unit.

The zoom lens according to each exemplary embodiment includes, in order from the object side to the image side, a first lens unit L1 having positive refractive power, a second lens unit L2 having negative refractive power, a third lens unit L3 having positive refractive power, and a fourth lens unit L4 having positive refractive power. SP denotes an aperture stop. G denotes an optical block, such as an optical filter, a faceplate, a crystal low-pass filter, or an infrared cutoff filter. IP denotes an image plane. On the image plane IP, an imaging surface of a solid-state image sensor (photoelectric conversion element), such as a charge-coupled device (CCD) sensor or a complementary metal-oxide semiconductor (CMOS) sensor, or a photosensitive surface of a silver-halide film is arranged.

In each aberration diagram, d and g denote d-line and g-line, respectively, and ΔM and ΔS denote a meridional image plane and a sagittal image plane, respectively. Chromatic aberration of magnification is expressed with g-line. ω denotes a half angle of view, and Fno denotes an F-number. Also, in each of the following exemplary embodiments, the wide-angle end and the telephoto end refer to zoom positions when a lens unit for variable magnification is positioned at the respective ends of a range in which the lens unit for variable magnification is mechanically movable along an optical axis.

In each exemplary embodiment, zooming from the wide-angle end to the telephoto end is performed by moving each lens unit as indicated by an arrow in each lens sectional view. In this case, at the telephoto end rather than the wide-angle end, a distance between the first lens unit L1 and the second lens unit L2 increases, a distance between the second lens unit L2 and the third lens unit L3 decreases, and a distance between the third lens unit L3 and the fourth lens unit L4 increases.

Specifically, during zooming from the wide-angle end to the telephoto end, the first lens unit L1 moves toward the image side and then moves toward the object side. That is, the first lens unit L1 moves with a locus convex toward the image side (along a curve convex toward the image side). Also, the second lens unit L2 moves toward the image side and then moves toward the object side. That is, the second lens unit L2 moves with a locus convex toward the image side (along a curve convex toward the image side).

During zooming from the wide-angle end to the telephoto end, the third lens unit L3 moves toward the object side. The fourth lens unit L4 moves with a locus convex toward the object side (along a curve convex toward the object side) to correct a variation in position of the image plane according to variable magnification.

In each exemplary embodiment, a rear focusing method is employed to correct the variation in the image plane according to variable magnification in the fourth lens unit L4 and perform focusing by moving on the optical axis (in a direction of the optical axis). A solid-line curve 4a and a dotted-line curve 4b for the fourth lens unit L4 in the lens sectional view represent a moving locus for correcting a variation on the image plane according to zooming from the wide-angle end to the telephoto end when focusing on an infinitely-distant object and a short-distance object, respectively.

By moving the fourth lens unit with the locus convex toward the object side during zooming, a space between the third lens unit L3 and the fourth lens unit L4 can be effectively used, and the total lens length can be effectively shortened.

In each exemplary embodiment, for example, when focusing from the infinitely-distant object to the short-distance object at the telephoto end, the fourth lens unit L4 moves forward as indicated by an arrow 4c in the lens sectional view. The aperture stop SP is arranged on the image side of the third lens unit L3 or within the third lens unit L3. The aperture stop SP moves integrally with the third lens unit L3 during zooming. In each exemplary embodiment, each of the first lens unit L1, the second lens unit L2, and the third lens unit L3 consists of a single positive lens and a single negative lens, and the fourth lens unit L4 consists of a single lens.

The focal lengths of the entire zoom lens at the wide-angle end and the telephoto end are denoted by fw and ft, respectively. The focal lengths of the first lens unit L1 and the second lens unit L2 are denoted by f1 and f2, respectively. In this case, the following conditions are satisfied:

$$6.0 < f1/fw < 20.0 \quad (1)$$

$$0.05 < |f2|/ft < 0.40 \quad (2)$$

The technical significance of each condition will be described below. The condition (1) defines the refractive power of the first lens unit L1. If the lower limit of the condition (1) is exceeded and thus the focal length of the first lens unit L1 becomes short, that is, if the refractive power of the first lens unit L1 becomes too strong, various aberrations greatly occur in the first lens unit L1. In particular, curvature of field and astigmatism greatly occur at the wide-angle end, and spherical aberration and axial chromatic aberration greatly occur at the telephoto end. Therefore, it is difficult to achieve a high zoom ratio.

Also, if the upper limit of the condition (1) is exceeded and thus the focal length of the first lens unit L1 becomes long, that is, if the refractive power becomes too weak, it is necessary to increase an amount of movement of the first lens unit L1 during zooming to provide a required variable magnification ratio to the second lens unit L2. As a result, the total lens length increases.

The condition (2) defines the refractive power of the second lens unit L2. If the lower limit of the condition (2) is exceeded and thus the focal length of the second lens unit L2 becomes short, that is, if the refractive power becomes too strong, coma and curvature of field occurring in the second lens unit L2 become too large. Therefore, it is difficult to correct these aberrations by using the other lens units. Also, if the upper limit of the condition (2) is exceeded and thus the focal length of the second lens unit L2 becomes long, that is, if the refractive power becomes too weak, it is necessary to increase an amount of movement of the second lens unit L2 during zooming to obtain a desired zoom ratio. Therefore, the total lens length increases.

By configuring the zoom lens as described above in each exemplary embodiment, the zoom lens having a high zoom ratio is obtained. Also, the zoom lens excellently corrects various aberrations over the entire zoom range and has a compact total lens length. The numerical ranges of the conditions (1) and (2) can also be set as follows:

$$7.0 < f1/fw < 17.0 \quad (1a)$$

$$0.09 < |f2|/ft < 0.35 \quad (2a)$$

In this case, a higher zoom ratio can easily be obtained, and various aberrations can easily be corrected over the entire zoom range. Also, if the numerical ranges of the conditions (1a) and (2a) are set as follows, the above-described effects represented by the conditions can be maximized.

$$7.2 < f1/fw < 14.0 \quad (1b)$$

$$0.12 < |f2|/ft < 0.30 \quad (2b)$$

According to each exemplary embodiment, the size of the entire zoom lens can be reduced, and the zoom lens can have a high zoom ratio. Also, the zoom lens can have high optical performance over the entire zoom range.

In each exemplary embodiment, the zoom lens may also satisfy one or more of the following conditions. Abbe numbers of materials of the positive lens and the negative lens constituting the third lens unit L3 are denoted by $vd3p$ and $vd3n$, respectively. Focal lengths of the positive lens and the negative lens constituting the third lens unit L3 are denoted by $f3p$ and $f3n$, respectively. A focal length of the third lens unit L3 is denoted by f3. A focal length of the fourth lens unit L4 is denoted by f4. Lateral magnifications of the second lens unit L2 at the wide-angle end and the telephoto end are denoted by $\beta 2w$ and $\beta 2t$, respectively. Lateral magnifications of the third lens unit L3 at the wide-angle end and the telephoto end are denoted by $\beta 3w$ and $\beta 3t$, respectively.

Amounts of movement of the first lens unit L1, the second lens unit L2, and the third lens unit L3 during zooming from the wide-angle end to the telephoto end are denoted by m1, m2, and m3, respectively. Thicknesses of the second lens unit L2 and the third lens unit L3 on the optical axis are denoted by D2 and D3, respectively. A refractive index of the material of the negative lens constituting the first lens unit L1 is denoted by N1n. A total lens length at the telephoto is denoted by Lt. A lateral magnification of the fourth lens unit L4 at the telephoto end is denoted by β4t. Also, regarding the sign of the amount of movement, a movement from the object side to the image side is defined as positive, and a movement from the image side to the object side is defined as negative.

A back focus is obtained by air conversion of a distance from a last lens surface to a paraxial image plane, and the total lens length is defined as the sum of the back focus and a distance from a lens surface (first lens surface) closest to the object side to the last lens surface. In this case, the zoom lens may also satisfy one or more of the following conditions:

$$20 < vd3p - vd3n < 70 \quad (3)$$

$$0.3 < f3p/f3n < 0.9 \quad (4)$$

$$0.2 < f4/ft < 0.7 \quad (5)$$

$$0.1 < (\beta 3t/\beta 3w)/(\beta 2t/(\beta 2w) < 2.5 \quad (6)$$

$$0.05 < (m1 \times m2)/(f1 \times f2) < 0.60 \quad (7)$$

$$1.6 < f3/fw < 4.0 \quad (8)$$

$$0.1 < D2/|m| < 3.0 \quad (9)$$

$$0.05 < (D2 + D3)/(|m2| + |m3|) < 0.90 \quad (10)$$

$$1.8 < \beta 2t/\beta 2w < 7.0 \quad (11)$$

$$0.35 < f3/f4 < 0.80 \quad (12)$$

$$1.7 < N1n < 2.6 \quad (13)$$

$$0.005 < D3/Lt < 0.090 \quad (14)$$

$$1.0 < (1 - \beta 3t)/\beta 4t < 2.5 \quad (15)$$

The technical significance of the above conditions will be described below.

The condition (3) defines the Abbe numbers (dispersions) of the materials of the positive lens and the negative lens constituting the third lens unit L3. The third lens unit L3 is configured with a minimum number of lenses necessary for chromatic aberration correction, that is, the single positive lens and the single negative lens, and performs chromatic aberration correction within the lens unit. The third lens unit L3 is a lens unit that manages a principal variable magnification together with the second lens unit L2. In order to suppress a zoom variation in axial chromatic aberration and chromatic aberration of magnification, it is necessary to perform chromatic aberration correction within the third lens unit L3.

If the lower limit of the condition (3) is exceeded and thus a difference between the Abbe numbers of the materials of the positive lens and the negative lens constituting the third lens unit L3 becomes too small, the refractive powers of the positive lens and the negative lens need to be strong to perform sufficient chromatic aberration correction within the third lens unit L3. If doing so, spherical aberration or coma greatly occurs over the entire zoom range, and it is difficult to correct these aberrations by using the other lens units. If the upper limit of the condition (3) is exceeded and thus a difference between the Abbe numbers of the materials of the positive lens and the negative lens constituting the third lens unit L3 becomes too large, primary chromatic aberration correction becomes easy, but secondary spectrum greatly occurs. Therefore, in particular, axial chromatic aberration correction becomes difficult.

The condition (4) defines a refractive power ratio between the positive lens and the negative lens constituting the third lens unit L3. If the lower limit of the condition (4) is exceeded and thus the focal length of the positive lens with respect to the negative lens becomes too short, that is, if the refractive power becomes strong, it is difficult to perform sufficient chromatic aberration correction within the third lens unit L3. In addition, since the positive refractive power of the third lens unit L3 excessively increases, spherical aberration and coma greatly occur from the third lens unit L3. Also, if the upper limit of the condition (4) is exceeded and thus the focal length of the positive lens with respect to the negative lens becomes too long, that is, if the refractive power excessively decreases, chromatic aberration correction within the third lens unit L3 becomes excessive.

Also, since the positive refractive power of the third lens unit L3 excessively decreases, zoom stroke of the third lens unit L3 increases and the lens becomes large in size.

The condition (5) defines the refractive power of the fourth lens unit L4. If the lower limit of the condition (5) is exceeded and thus the focal length of the fourth lens unit L4 becomes too short, that is, if the refractive power excessively increases, a variation in curvature of field, astigmatism, and chromatic aberration of magnification according to focusing increases. Also, if the upper limit of the condition (5) is exceeded and thus the focal length of the fourth lens unit L4 becomes too long, that is, if the refractive power excessively decreases, an amount of movement for correcting a variation in the position of the image plane during zooming becomes too large. Therefore, the total lens length increases.

The condition (6) defines the variable magnification sharing of the second lens unit L2 and the third lens unit L3. If the lower limit of the condition (6) is exceeded and thus the variable magnification ratio of the third lens unit L3 becomes too low, the variable magnification ratio to be shared by the second lens unit L2 becomes too high. Therefore, curvature of field, astigmatism, and coma greatly occur from the second lens unit L2, and it is difficult to correct these aberrations by using the other lens units. Also, if the upper limit of the condition (6) is exceeded and thus the variable magnification ratio of the second lens unit L2 becomes too low, the variable magnification ratio to be shared by the third lens unit L3 becomes too high. Therefore, curvature of field and coma greatly occur from the third lens unit L3.

The condition (7) defines the zoom strokes and the refractive powers of the first lens unit L1 and the second lens unit L2. If the lower limit of the condition (7) is exceeded, the zoom strokes of the first lens unit L1 and the second lens unit L2 become small, and the refractive powers of the first lens unit L1 and the second lens unit L2 become too high. In this case, the variable magnification ratio of the third lens unit L3 decreases. Therefore, it is necessary to relatively increase the variable magnification ratio of the third lens unit L3.

As a result, spherical aberration and coma greatly occur from the third lens unit L3, and it is difficult to correct these aberrations by using the other lens units.

The condition (8) defines the refractive power of the third lens unit L3. If the lower limit of the condition (8) is exceeded and thus the focal length of the third lens unit L3 becomes short, that is, if the refractive power becomes too strong, spherical aberration, axial chromatic aberration, and coma greatly occur from the third lens unit L3, and it is difficult to correct these aberrations by using the other lens units. Also, if the upper limit of the condition (8) is exceeded and thus the focal length of the third lens unit L3 becomes long, that is, if the refractive power of the third lens unit L3 becomes too weak, it is necessary to increase the zoom stroke of the third lens unit L3 to obtain a desired zoom ratio. If doing so, it is undesirable because the total lens length increases.

The condition (9) defines the thickness of the second lens unit L2 on the optical axis with respect to the zoom stroke. If the lower limit of the condition (9) is exceeded and thus the thickness of the second lens unit L2 on the optical axis becomes too small, it is difficult to take sufficient air spacing between the negative lens and the positive lens of the second lens unit L2. Therefore, it is difficult to provide sufficient curvature to the image-side lens surface of the negative lens. As a result, it is difficult to provide sufficient negative refractive power to an air lens formed by the image-side lens surface of the negative lens of the second lens unit L2 and the object-side lens surface of the positive lens of the second lens unit L2. Therefore, it is difficult to correct curvature of field and astigmatism at the wide-angle end.

Also, if the upper limit of the condition (9) is exceeded and thus the thickness of the second lens unit L2 on the optical axis becomes too large, the second lens unit L2 becomes long, and the distance between the aperture stop SP and the lens unit of the front lens becomes too long. Therefore, the effective diameter of the front lens increases. Also, in a lens barrel with a retractable lens structure, it is undesirable because an entire lens barrel length during retraction increases.

The condition (10) defines the thicknesses of the second lens unit L2 and the third lens unit L3 on the optical axis with respect to the zoom stroke. If the lower limit of the condition (10) is exceeded, the zoom strokes of the second lens unit L2 and the third lens unit L3 become too long, and the lens unit thickness of the second lens unit L2 and the third lens unit L3 becomes too small. In this case, the total lens length increases. Also, in a lens barrel with a retractable lens structure, this is advantageous to shorten the total lens length during retraction. However, since the total lens length becomes long, the number of stages of lens barrels increases and the lens barrel diameter increases to fold the zoom strokes of the second lens unit L2 and the third lens unit L3.

Also, if the upper limit of the condition (10) is exceeded and thus the zoom strokes of the second lens unit L2 and the third lens unit L3 become too short, it is necessary to increase the refractive powers of the second lens unit L2 and the third lens unit L3 to secure a required zoom ratio. As a result, a variation in aberrations according to zooming increases. In particular, it is undesirable because curvature of field, astigmatism, and coma greatly occur from the second lens unit L2, and spherical aberration and coma greatly occur from the third lens unit L3.

The condition (11) defines the variable magnification sharing of the second lens unit L2. The variable magnification ratio to be shared by the second lens unit L2 is defined as the condition (11). If the lower limit of the condition (11) is exceeded and thus the variable magnification ratio of the second lens unit L2 becomes too low, the variable magnification ratio of the third lens unit L3 is relatively increased. Therefore, spherical aberration and coma greatly occur from the third lens unit L3, and it is difficult to correct these aberrations by using the other lens units. On the other hand, if the upper limit of the condition (11) is exceeded and thus the variable magnification ratio of the second lens unit L2 becomes too high, it is necessary to strengthen the refractive power of the second lens unit L2. Therefore, it is undesirable because curvature of field, astigmatism, and coma greatly occur from the second lens unit L2.

The condition (12) defines the refractive powers of the third lens unit L3 and the fourth lens unit L4. If the lower limit of the condition (12) is exceeded and thus the focal length of the third lens unit L3 becomes short, that is, if the refractive power of the third lens unit L3 becomes too strong, spherical aberration and coma greatly occur from the third lens unit L3. Also, if the upper limit of the condition (12) is exceeded and thus the focal length of the fourth lens unit L4 consisting of the single positive lens becomes short, that is, if the refractive power of the fourth lens unit L4 becomes too strong, a variation in curvature of field, astigmatism, and chromatic aberration of magnification according to focusing increases.

The condition (13) defines the refractive index of the material of the negative lens of the first lens unit L1. If the lower limit of the condition (13) is exceeded and thus the refractive index becomes too small, the curvature of the lens surface of the negative lens of the first lens unit L1, which is required to perform chromatic aberration correction within the first lens unit L1, becomes too strong. Therefore, spherical aberration greatly occurs from the negative lens of the first lens unit L1, in particular, near the telephoto end, and it is difficult to correct spherical aberration by using the positive lens of the first lens unit L1 and the other lens units. On the other hand, if the upper limit of the condition (13) is exceeded and thus the refractive index becomes too large, aberration correction can be easily performed.

However, in the case of a transparent material such as a general glass or ceramic, as the refractive power increases, dispersion increases. Therefore, secondary spectrum at the telephoto end becomes large, and the aberration correction becomes difficult.

The condition (14) defines the lens thickness of the third lens unit L3 with respect to the total lens length at the telephoto end of the entire zoom lens. If the lower limit of the condition (14) is exceeded and thus the total lens length at the telephoto end increases, the entire lens system becomes large in size. Also, if the lower limit of the condition (14) is exceeded and thus the thickness of the third lens unit L3 becomes too small, it is difficult to provide sufficient curvature to the lens surface of the positive lens of the third lens unit L3. Therefore, the refractive power of the third lens unit L3 becomes too low. Therefore, in order to obtain a required zoom ratio, the zoom stroke of the third lens unit L3 is excessively increased, resulting in an increase in the total lens length.

Also, if the upper limit of the condition (14) is exceeded and thus the thickness of the third lens unit L3 on the optical axis becomes too large, the total lens length increases. In particular, in a lens barrel with a retractable lens structure, it is undesirable because an entire lens barrel length during retraction increases The condition (15) defines the lateral magnifications of the third lens unit L3 and the fourth lens unit L4 at the telephoto end. The sign of the lateral magnification of the fourth lens unit L4 is positive. However, if the lower limit of the condition (15) is exceeded and thus the lateral magnification of the fourth lens unit L4 at the telephoto end becomes too high, a distance between the fourth lens unit L4 and the image forming position, that is, the back focus, becomes too short. As a result, a variation in a focus position by manufacturing error or assembly error of the entire lens system is difficult to correct by using the fourth lens unit L4.

On the other hand, if the upper limit of the condition (15) is exceeded and thus the lateral magnification of the fourth lens unit L4 at the telephoto end becomes too low, the back focus at the telephoto end becomes too long, resulting in an increase in the total lens length. Also, the condition (15) corresponds to a formula defining eccentricity sensitivity during image stabilization, which represents a ratio of an amount of movement of a component of a direction perpendicular to the optical axis of the third lens unit L3 at the telephoto end to an amount of movement of a resultant image point on an image forming plane. As the value of the condition (15) is larger, the image point can be easily moved with a small amount of movement.

In each exemplary embodiment, the third lens unit L3 may be used as a correction lens for image stabilization. Specifically, an image shake caused by a camera shake may be corrected by moving the third lens unit L3 in a direction having a component of a direction perpendicular to the optical axis. In this case, if the lower limit of the condition (15) is exceeded and thus the eccentricity sensitivity becomes too low, an amount of movement for image-shake correction becomes too large, resulting in an increase in the size of the third lens unit L3. Also, if the upper limit of the condition (15) is exceeded and thus the eccentricity sensitivity becomes too high, an amount of movement for image-shake correction becomes too small. Therefore, it is difficult to control the amount of image-shake correction with satisfactory accuracy.

Also, the numerical ranges of the above-described conditions can also be set as follows:

$$25 < \nu d3p - \nu d3n < 60 \quad (3a)$$

$$0.4 < f3p/f3n < 0.8 \quad (4a)$$

$$0.25 < f4/ft < 0.60 \quad (5a)$$

$$0.2 < (\beta 3t/\beta 3w)/(\beta 2t/\beta 2w) < 2.0 \quad (6a)$$

$$0.1 < (m1 \times m2)/(f1 \times f2) < 0.5 \quad (7a)$$

$$1.8 < f3/fw < 3.5 \quad (8a)$$

$$0.2 < D2/|m2| < 2.0 \quad (9a)$$

$$0.1 < (D2+D3)/(|m2|+|m3|) < 0.7 \quad (10a)$$

$$2.1 < \beta 2t/\beta 2w < 6.0 \quad (11a)$$

$$0.4 < f3/f4 < 0.7 \quad (12a)$$

$$1.75 < N1n < 2.40 \quad (13a)$$

$$0.010 < D3/Lt < 0.075 \quad (14a)$$

$$1.3 < (1-\beta 3t)/\beta 4t < 2.2 \quad (15a)$$

Also, if the numerical ranges of the conditions are set as follows, the above-described effects exhibited by the conditions can be maximized.

$$30 < \nu d3p - \nu d3n < 55 \quad (3b)$$

$$0.5 < f3p/f3n < 0.7 \quad (4b)$$

$$0.30 < f4/ft < 0.55 \quad (5b)$$

$$0.3 < (\beta 3t/\beta 3w)/(\beta 2t/\beta 2w) < 1.7 \quad (6b)$$

$$0.15 < (m1 \times m2)/(f1 \times f2) < 0.40 \quad (7b)$$

$$2.0 < f3/fw < 3.0 \quad (8b)$$

$$0.25 < D2/|m2| < 1.30 \quad (9b)$$

$$0.15 < (D2+D3)/(|m2|+|m3|) < 0.50 \quad (10b)$$

$$2.3 < \beta 2t/\beta 2w < 5.0 \quad (11b)$$

$$0.45 < f3/f4 < 0.60 \quad (12b)$$

$$1.8 < N1n < 2.3 \quad (13b)$$

$$0.02 < D3/Lt < 0.06 \quad (14b)$$

$$1.5 < (1-\beta 3t)/\beta 4t < 2.0 \quad (15b)$$

According to each exemplary embodiment, by setting the respective configuration requirements as described above, various aberrations are excellently corrected at a high zoom ratio over the entire zoom range. Therefore, a zoom lens having a compact total lens length can be obtained.

Next, the features of the lens structure according to each exemplary embodiment will be described. Each of the first lens unit L1, the second lens unit L2, and the third lens unit L3 consists of a single positive lens and a single negative lens, and performs chromatic aberration correction within the lens unit to suppress a variation in axial chromatic aberration and chromatic aberration of magnification during zooming. Also, since the number of lenses constituting each of the first lens unit L1, the second lens unit L2, and the third lens unit L3 is set to two, which is minimally necessary for chromatic aberration correction, the thickness of the lens unit is reduced and thus the total lens length is effectively shortened.

The first lens unit L1 may be a single cemented lens, in which a positive lens and a negative lens are cemented to each other, or may be two independent lenses with an air gap therebetween. If the first lens unit L1 is provided with the cemented lens, it is possible to reduce the degradation of the optical performance caused by the eccentricity between the positive lens and the negative lens. Therefore, the lens thickness of the first lens unit L1 can be effectively reduced.

On the other hand, if the first lens unit L1 is provided with two independent lenses, the degree of freedom of curvature of the lens surface increases. Therefore, a higher level of aberration correction becomes easy. Also, one or more surfaces of the lenses constituting the first lens unit L1 may have an aspheric surface shape. According to this, a variation in curvature of field or astigmatism during zooming is easy to correct with a higher level. The second lens unit L2 includes, in order from the object side to the image side, two lenses, that is, a negative lens having a concave surface of strong refractive power directed toward the image side as compared with the object side, and a positive lens having a convex surface directed toward the object side.

Any of the two lenses easily corrects curvature of field or distortion by reducing an incidence angle and an exit angle of off-axis light beam passing through a high position from the optical axis at the telephoto end. Also, one or more surfaces of the negative lens of the second lens unit L2 may have an aspheric surface shape. In this case, a variation in curvature of field or astigmatism during zooming is effectively suppressed. Also, an aspheric surface may be used in the positive lens of the second lens unit L2.

The third lens unit L3 consists of, in order from the object side to the image side, two lenses, that is, a positive lens having a convex surface of strong refractive power facing the object side as compared with the image side, and a negative lens of a meniscus shape having a convex surface facing the object side. Since the lens surface of the positive lens has an aspheric surface shape, aspheric aberration and coma are excellently corrected over the entire zoom range. Also, an aspheric surface may be used in the negative lens. According to this, the aberrations are easy to correct with a higher level.

In the first to fifth exemplary embodiments, the aperture stop SP is arranged on the image side of the third lens unit L3, and moves integrally with the third lens unit L3 during zooming. As compared with the configuration in which the third lens unit L3 is arranged on the object side, the arrangement of the aperture stop SP can effectively use the space between the third lens unit L3 and the fourth lens unit L4. Therefore, this is advantageous to shorten the total lens length. In addition, since the space required for the aperture stop SP between the second lens unit L2 and the third lens unit L3 is unnecessary, the two variable magnification lens units can be easily made closer to each other at the telephoto end, and a high zoom ratio can be easily achieved.

Generally, if the aperture stop SP is arranged on the image side of the third lens unit L3, the aperture stop SP becomes far away from the front lens by only the thickness of the third lens unit L3, as compared with the configuration in which the aperture stop SP is arranged on the object side. This is disadvantageous to reduce the effective diameter of the front lens. However, on the other hand, since the distance between the second lens unit L2 and the third lens unit L3 can be shortened, the effective diameter of the front lens can also be reduced.

In the zoom lens of each exemplary embodiment, by combining the arrangement of the aperture stop SP and the slim third lens unit L3 provided with two lenses, the demerit of the former is made to exceed the merit of the latter. As a result, the effective diameter of the front lens is reduced. When a shutter mechanism is required, in order to suppress unevenness of light intensity on a screen at the time of opening and closing a shutter, the shutter mechanism can be arranged near the aperture stop SP arranged on the image side of the third lens unit L3, and move integrally with the third lens unit L3 during zooming.

Even in this case, as the space required for the shutter mechanism, the space between the third lens unit L3 and the fourth lens unit L4 can be used. Therefore, as compared with the configuration in which the aperture stop SP and the shutter mechanism are arranged on the object side of the third lens unit L3, the total lens length can be more shortened and the effective diameter of the front lens can be more reduced.

In the sixth exemplary embodiment, the aperture stop SP is arranged between the positive lens and the negative lens of the third lens unit L3, and moves integrally with the third lens unit L3 during zooming. A high zoom ratio is easily obtained in such a manner that the space between the two lenses constituting the third lens unit L3 is effectively used, and the second lens unit L2 and the third lens unit L3 are made closer to each other at the telephoto end. When the shutter mechanism is required, the shutter mechanism may be arranged near the aperture stop SP within the third lens unit L3, or may be arranged on the image side of the third lens unit L3.

Since the fourth lens unit L4 less contributes to the variation magnification, the fourth lens unit L4 is provided with the single positive lens. Therefore, the total lens length is shortened, and the lens weight is reduced. As a result, the increase of the focus speed is facilitated. By using the aspheric surface in the positive lens, a variation in curvature of field and aberrations according to focusing is effectively suppressed. Also, a shake of a photographed image may be corrected by moving all or part of the third lens unit L3 in a direction having a component of a direction orthogonal to the optical axis.

In each exemplary embodiment as described above, each lens unit is provided with two or less lenses, and the zoom lens having a compact total lens length at a high zoom ratio of 7 times or more is obtained.

Hereinafter, numerical examples corresponding to the respective exemplary embodiments of the present invention will be described.

In each numerical example, a surface number denotes an order of an optical surface from an object side, r denotes a radius of curvature of the optical surface, d denotes a surface distance, and nd and vd respectively denote refractive power and Abbe number of a material of an optical member with respect to d-line. The last two lens surfaces are glass block.

A back focus (BF) is obtained by air conversion of a distance from a last lens surface to a paraxial image plane, and a total lens length is defined as the sum of the back focus and a distance from a forefront lens surface to a last lens surface. The unit of length is mm. Also, when K is a conic constant, A3, A4, A5, A6, A7, A8, A10 and A12 are aspheric coefficients, and X is a displacement from a surface vertex along an optical axis at a position of a height H from an optical axis, the aspheric surface shape is expressed as:

$$X = \frac{(1/R)H^2}{1 + \sqrt{1 - (1+K)(H/R)^2}} + A3H^3 + A4H^4 + A5H^5 + A6H^6 + A7H^7 + A8H^8 + A10H^{10} + A12H^{12}$$

R is a radius of curvature. Also, for example, the expression "e-Z" represents "$10^{-Z}$". Also, the correspondence to the conditions described above in each numerical example is given in Table 1 below. A half angle of view is a value calculated by ray-trace.

Numerical Example 1

| Unit: mm | | | | |
|---|---|---|---|---|
| Surface Data | | | | |
| Surface Number | r | d | nd | vd |
| 1 | 26.848 | 0.70 | 2.00069 | 25.5 |
| 2 | 16.823 | 3.04 | 1.80400 | 46.6 |
| 3 | 169.010 | (Variable) | | |
| 4* | −45.145 | 0.70 | 1.86400 | 40.6 |
| 5* | 5.600 | 1.52 | | |
| 6 | 8.492 | 1.60 | 1.95906 | 17.5 |
| 7 | 15.319 | (Variable) | | |
| 8* | 4.758 | 1.28 | 1.58313 | 59.4 |
| 9* | −34.905 | 0.40 | | |
| 10 | 5.297 | 0.68 | 1.94595 | 18.0 |
| 11 | 3.479 | 0.70 | | |
| 12 (Stop) | ∞ | (Variable) | | |
| 13* | 16.046 | 1.26 | 1.69350 | 53.2 |
| 14* | 393.282 | (Variable) | | |
| 15 | ∞ | 0.80 | 1.51633 | 64.1 |
| 16 | ∞ | 0.50 | | |
| Image Plane | ∞ | | | |

Aspheric Surface Data

Fourth Surface

K = 0.00000e+000  A6 = 1.06383e−006  A8 = −1.45930e−008
A10 = 7.14729e−011

Fifth Surface

K = −4.95506e−001  A4 = 1.72153e−004  A6 = 1.19940e−005
A8 = 7.82138e−008  A10 = −1.05403e−008  A12 = 1.66656e−010
A3 = −1.76485e−004  A5 = −7.91343e−005

Eighth Surface

K = −9.80727e−001  A4 = 1.86868e−006  A6 = −1.03744e−005
A8 = −4.85111e−007  A10 = −1.92301e−006

Ninth Surface

K = 0.00000e+000  A4 = −2.94322e−004  A6 = 4.63543e−005
A8 = −2.12448e−005

Thirteenth Surface

K = −2.81797e+000  A4 = −9.02156e−005  A6 = 2.46070e−008
A8 = −2.68077e−008  A3 = −2.20563e−004

Unit: mm

Fourteenth Surface

K = 0.00000e+000    A4 = −2.27433e−004

Various Data
Zoom Ratio 9.63

| | | | | |
|---|---|---|---|---|
| Focal Length | 5.13 | 8.56 | 21.78 | 49.41 |
| F-number | 3.56 | 4.05 | 4.96 | 5.77 |
| Half Angle of View | 33.01 | 24.35 | 10.09 | 4.48 |
| Image Height | 3.33 | 3.88 | 3.88 | 3.88 |
| Total Lens Length | 45.37 | 41.67 | 50.05 | 61.16 |
| BF | 5.31 | 7.59 | 11.40 | 7.81 |
| d3 | 1.33 | 4.29 | 15.78 | 25.75 |
| d7 | 20.52 | 11.42 | 3.63 | 0.40 |
| d12 | 6.32 | 6.50 | 7.37 | 15.33 |
| d14 | 4.29 | 6.56 | 10.38 | 6.78 |

Zoom Lens Unit Data

| Unit | Starting Surface | Focal Length |
|---|---|---|
| 1 | 1 | 47.07 |
| 2 | 4 | −8.92 |
| 3 | 8 | 11.62 |
| 4 | 13 | 24.09 |

Numerical Example 2

Surface Data

| Surface Number | r | d | nd | vd |
|---|---|---|---|---|
| 1 | 30.563 | 3.31 | 1.77250 | 49.6 |
| 2 | −46.732 | 0.70 | 2.00069 | 25.5 |
| 3 | −693.658 | (Variable) | | |
| 4* | −47.006 | 1.20 | 1.85135 | 40.1 |
| 5* | 5.122 | 1.70 | | |
| 6 | 8.701 | 1.87 | 2.14352 | 17.8 |
| 7 | 14.029 | (Variable) | | |
| 8* | 5.530 | 1.89 | 1.58313 | 59.4 |
| 9* | −16.775 | 0.85 | | |
| 10 | 6.260 | 0.85 | 2.10205 | 16.8 |
| 11 | 3.998 | 0.60 | | |
| 12 (Stop) | ∞ | (Variable) | | |
| 13* | 14.900 | 1.40 | 1.69350 | 53.2 |
| 14* | −451.928 | (Variable) | | |
| 15 | ∞ | 0.80 | 1.51633 | 64.1 |
| 16 | ∞ | 0.51 | | |
| Image Plane | ∞ | | | |

Aspheric Surface Data

Fourth Surface

K = 0.00000e+000    A6 = 6.26238e−008    A8 = −1.22122e−008
A10 = 1.79060e−010

Fifth Surface

K = −5.01501e−001    A4 = 1.35924e−004    A6 = 1.49130e−005
A8 = 1.00441e−007    A10 = −2.64612e−008    A12 = 4.87087e−010
A3 = −2.42927e−004    A5 = −1.15312e−004

Eighth Surface

K = −8.14626e−001    A4 = −3.88658e−004    A6 = −2.01115e−005
A8 = 2.06505e−006    A10 = −1.22850e−006

Ninth Surface

K = 0.00000e+000    A4 = −7.58286e−005    A6 = 1.56860e−005
A8 = −1.20840e−005

Thirteenth Surface

K = −5.86588e+000    A4 = −2.92829e−005    A6 = 5.70356e−007
A8 = −5.02333e−008    A3 = −2.02877e−004

Fourteenth Surface

K = 0.00000e+000    A4 = −3.17846e−004

Various Data
Zoom Ratio 9.96

| | | | | |
|---|---|---|---|---|
| Focal Length | 4.87 | 7.34 | 22.20 | 48.50 |
| F-number | 3.55 | 3.87 | 5.02 | 5.79 |
| Half Angle of View | 34.39 | 27.83 | 9.90 | 4.57 |
| Image Height | 3.33 | 3.88 | 3.88 | 3.88 |
| Total Lens Length | 46.13 | 41.44 | 51.99 | 62.46 |
| BF | 4.26 | 6.68 | 10.75 | 6.81 |
| d3 | 1.33 | 3.01 | 16.23 | 25.34 |
| d7 | 20.02 | 11.90 | 3.32 | 0.95 |
| d12 | 6.14 | 5.47 | 7.32 | 14.98 |
| d14 | 3.22 | 5.64 | 9.71 | 5.78 |

Zoom Lens Unit Data

| Unit | Starting Surface | Focal Length |
|---|---|---|
| 1 | 1 | 45.48 |
| 2 | 4 | −8.28 |
| 3 | 8 | 11.07 |
| 4 | 13 | 20.82 |

Numerical Example 3

Surface Data

| Surface Number | r | d | nd | vd |
|---|---|---|---|---|
| 1 | 25.101 | 0.30 | 2.04632 | 24.6 |
| 2 | 17.257 | 0.08 | | |
| 3 | 17.677 | 1.85 | 1.82103 | 51.1 |
| 4 | 218.206 | (Variable) | | |
| 5* | −45.880 | 0.25 | 2.04923 | 39.2 |
| 6* | 5.373 | 0.58 | | |
| 7 | 7.324 | 1.29 | 2.18622 | 20.7 |
| 8 | 17.667 | (Variable) | | |
| 9* | 3.616 | 0.87 | 1.74782 | 62.9 |
| 10* | 22.735 | 0.15 | | |
| 11 | 4.382 | 0.35 | 2.00069 | 25.5 |
| 12 | 2.762 | 0.80 | | |
| 13 (Stop) | ∞ | (Variable) | | |
| 14* | 22.197 | 0.75 | 1.75501 | 51.2 |
| 15* | −78.832 | (Variable) | | |
| 16 | ∞ | 0.80 | 1.51633 | 64.1 |
| 17 | ∞ | 0.51 | | |
| Image Plane | ∞ | | | |

Aspheric Surface Data

Fifth Surface

K = 0.00000e+000    A6 = 3.43665e−007    A8 = −6.54976e−008
A10 = 1.23544e−009

Sixth Surface

K = −6.59011e−001    A4 = 3.54302e−004    A6 = 4.63082e−005
A8 = 4.99993e−007    A10 = −2.85268e−008    A12 = 6.48616e−010
A3 = −1.96290e−004    A5 = −1.40048e−004    A7 = −6.26649e−006

Ninth Surface

K = −4.69289e−001    A4 = 4.80005e−004    A6 = 2.84921e−005
A8 = 4.53903e−006    A10 = 3.26745e−006

Tenth Surface

K = 0.00000e+000    A4 = 6.42311e−004    A6 = −4.24644e−005
A8 = 2.98591e−005

-continued

| Fourteenth Surface | | |
|---|---|---|
| K = 1.14452e+001 | A4 = −1.55084e−005 | A6 = 8.79116e−006 |
| A8 = −6.71301e−007 | A10 = 1.50625e−008 | A3 = −2.36926e−004 |

| Fifteenth Surface | | |
|---|---|---|
| K = 0.00000e+000 | A4 = 8.64915e−005 | A6 = 1.85921e−006 |

Various Data
Zoom Ratio 10.10

| | | | | |
|---|---|---|---|---|
| Focal Length | 5.50 | 8.30 | 25.74 | 55.50 |
| F-number | 3.55 | 4.00 | 5.01 | 5.77 |
| Half Angle of View | 31.23 | 25.03 | 8.56 | 3.99 |
| Image Height | 3.33 | 3.88 | 3.88 | 3.88 |
| Total Lens Length | 37.77 | 35.59 | 46.55 | 54.76 |
| BF | 7.95 | 9.64 | 12.69 | 6.34 |
| d4 | 0.86 | 3.03 | 16.83 | 24.72 |
| d8 | 17.55 | 11.23 | 3.20 | 0.20 |
| d13 | 4.14 | 4.41 | 6.56 | 16.23 |
| d15 | 6.91 | 8.61 | 11.65 | 5.30 |

Zoom Lens Unit Data

| Unit | Starting Surface | Focal Length |
|---|---|---|
| 1 | 1 | 41.64 |
| 2 | 5 | −8.85 |
| 3 | 9 | 11.84 |
| 4 | 14 | 23.01 |

Numerical Example 4

Surface Data

| Surface Number | r | d | nd | νd |
|---|---|---|---|---|
| 1 | 30.468 | 0.40 | 2.04821 | 21.4 |
| 2 | 19.463 | 2.96 | 1.88300 | 40.8 |
| 3 | 124.274 | (Variable) | | |
| 4* | −40.878 | 0.30 | 1.72903 | 54.0 |
| 5* | 5.355 | 1.88 | | |
| 6 | 7.935 | 1.52 | 2.00178 | 19.3 |
| 7* | 10.870 | (Variable) | | |
| 8* | 4.846 | 1.26 | 1.55332 | 71.7 |
| 9* | −41.513 | 0.73 | | |
| 10 | 5.228 | 0.50 | 1.92286 | 20.9 |
| 11 | 3.593 | 0.60 | | |
| 12 (Stop) | ∞ | (Variable) | | |
| 13* | 11.302 | 1.33 | 1.55332 | 71.7 |
| 14* | 224.664 | (Variable) | | |
| 15 | ∞ | 0.50 | 1.51633 | 64.1 |
| 16 | ∞ | 0.52 | | |
| Image Plane | ∞ | | | |

Aspheric Surface Data

| Fourth Surface | | |
|---|---|---|
| K = 0.00000e+000 | A6 = 1.93402e−006 | A8 = −2.15151e−008 |
| A10 = 7.90288e−011 | | |

| Fifth Surface | | |
|---|---|---|
| K = −6.12339e−001 | A4 = 5.54156e−004 | A6 = 5.81813e−006 |
| A8 = 1.42003e−007 | A10 = −2.59431e−009 | A12 = 9.25837e−011 |
| A3 = −2.05229e−004 | A5 = −1.17294e−004 | |

| Seventh Surface | | |
|---|---|---|
| K = 5.09956e−001 | A4 = −1.43755e−004 | A6 = 8.99152e−006 |
| A8 = −1.48617e−007 | | |

| Eighth Surface | | |
|---|---|---|
| K = −9.46213e−001 | A4 = −7.91132e−005 | A6 = −2.68622e−005 |
| A8 = −3.83810e−006 | A10 = −2.25872e−006 | |

-continued

| Ninth Surface | | |
|---|---|---|
| K = 0.00000e+000 | A4 = −4.11085e−004 | A6 = 2.69388e−005 |
| A8 = −2.71779e−005 | | |

| Thirteenth Surface | | |
|---|---|---|
| K = −3.56709e+000 | A4 = 2.25243e−004 | A6 = −2.32025e−006 |
| A8 = 3.13733e−008 | A3 = −1.30860e−004 | |

| Fourteenth Surface | | |
|---|---|---|
| K = 0.00000e+000 | A4 = −9.47252e−005 | |

Various Data
Zoom Ratio 14.49

| | | | | |
|---|---|---|---|---|
| Focal Length | 4.52 | 7.64 | 32.11 | 65.50 |
| F-number | 3.18 | 3.70 | 5.09 | 6.17 |
| Half Angle of View | 35.75 | 26.90 | 6.88 | 3.39 |
| Image Height | 3.25 | 3.88 | 3.88 | 3.88 |
| Total Lens Length | 46.85 | 44.48 | 60.02 | 71.36 |
| BF | 6.62 | 7.86 | 13.37 | 6.47 |
| d3 | 1.21 | 5.01 | 23.37 | 31.51 |
| d7 | 22.93 | 13.82 | 1.81 | 0.45 |
| d12 | 4.62 | 6.32 | 9.99 | 21.46 |
| d14 | 5.76 | 7.00 | 12.52 | 5.61 |

Zoom Lens Unit Data

| Unit | Starting Surface | Focal Length |
|---|---|---|
| 1 | 1 | 52.07 |
| 2 | 4 | −9.12 |
| 3 | 8 | 12.68 |
| 4 | 13 | 21.46 |

Numerical Example 5

Surface Data

| Surface Number | r | d | nd | νd |
|---|---|---|---|---|
| 1 | 23.389 | 0.70 | 2.16434 | 24.1 |
| 2 | 16.101 | 3.26 | 1.80400 | 46.6 |
| 3 | 124.243 | (Variable) | | |
| 4* | −50.894 | 0.70 | 1.86400 | 40.6 |
| 5* | 4.542 | 1.76 | | |
| 6 | 8.348 | 1.51 | 1.95906 | 17.5 |
| 7 | 16.651 | (Variable) | | |
| 8* | 4.707 | 1.59 | 1.62263 | 58.2 |
| 9* | −12.958 | 0.60 | | |
| 10 | 5.434 | 0.75 | 1.94595 | 18.0 |
| 11* | 3.135 | 0.70 | | |
| 12 (Stop) | ∞ | (Variable) | | |
| 13* | 9.686 | 1.97 | 1.49710 | 81.6 |
| 14* | −45.782 | (Variable) | | |
| 15 | ∞ | 0.80 | 1.51633 | 64.1 |
| 16 | ∞ | 0.50 | | |
| Image Plane | ∞ | | | |

Aspheric Surface Data

| Fourth Surface | | |
|---|---|---|
| K = 0.00000e+000 | A6 = 2.57466e−007 | A8 = −1.68159e−008 |
| A10 = 2.84318e−010 | | |

| Fifth Surface | | |
|---|---|---|
| K = −5.81193e−001 | A4 = 1.90222e−005 | A6 = 2.26531e−005 |
| A8 = −4.57466e−007 | A10 = −2.81239e−008 | A12 = 8.37155e−010 |
| A3 = −2.37232e−004 | A5 = −9.25797e−005 | |

| Eighth Surface | | |
|---|---|---|
| K = −1.44022e+000 | A4 = −2.99313e−004 | A6 = −1.75512e−004 |
| A8 = 7.18376e−007 | A10 = −4.35454e−006 | |

-continued

Ninth Surface

K = 0.00000e+000   A4 = −4.77281e−004   A6 = −1.85557e−004
A8 = −1.97197e−005

Eleventh Surface

K = 1.20325e−002   A4 = −1.50930e−004   A6 = 4.17933e−005

Thirteenth Surface

K = −2.66156e−001   A4 = 5.49882e−004   A6 = −1.15577e−005
A8 = 2.64659e−007   A3 = −1.52365e−003

Fourteenth Surface

K = 0.00000e+000   A4 = 5.79508e−005

Various Data
Zoom Ratio 7.58

| Focal Length | 4.16 | 6.69 | 16.19 | 31.55 |
| F-number | 3.26 | 3.72 | 4.81 | 5.77 |
| Half Angle of View | 38.69 | 30.06 | 13.46 | 7.00 |
| Image Height | 3.33 | 3.88 | 3.88 | 3.88 |
| Total Lens Length | 37.33 | 33.25 | 43.30 | 53.92 |
| BF | 2.83 | 4.56 | 6.56 | 4.73 |
| d3 | 1.33 | 2.60 | 12.74 | 21.54 |
| d7 | 15.16 | 7.73 | 2.22 | 0.70 |
| d12 | 4.47 | 4.83 | 8.25 | 13.42 |
| d14 | 1.80 | 3.53 | 5.53 | 3.70 |

Zoom Lens Unit Data

| Unit | Starting Surface | Focal Length |
|---|---|---|
| 1 | 1 | 46.04 |
| 2 | 4 | −7.57 |
| 3 | 8 | 8.92 |
| 4 | 13 | 16.27 |

Numerical Example 6

Surface Data

| Surface Number | r | d | nd | νd |
|---|---|---|---|---|
| 1 | 28.262 | 0.70 | 1.84666 | 23.9 |
| 2 | 16.844 | 3.06 | 1.80400 | 46.6 |
| 3* | 150.087 | (Variable) | | |
| 4* | −40.484 | 0.70 | 1.86400 | 40.6 |
| 5* | 5.803 | 1.83 | | |
| 6 | 9.178 | 1.31 | 2.10205 | 16.8 |
| 7* | 14.454 | (Variable) | | |
| 8* | 5.513 | 1.16 | 1.67790 | 54.9 |
| 9* | −46.360 | 0.60 | | |
| 10 (Stop) | ∞ | 0.60 | | |
| 11 | 5.534 | 0.50 | 2.10205 | 16.8 |
| 12 | 3.764 | (Variable) | | |
| 13* | 15.809 | 1.35 | 1.69350 | 53.2 |
| 14* | −422.956 | (Variable) | | |
| 15 | ∞ | 0.80 | 1.51633 | 64.1 |
| 16 | ∞ | 0.51 | | |
| Image Plane | ∞ | | | |

Aspheric Surface Data

Third Surface

K = 5.45871e+000   A4 = 6.38273e−007   A6 = 1.74801e−009

Fourth Surface

K = 0.00000e+000   A6 = 1.35140e−006   A8 = 8.36127e−010
10 = −2.32185e−010

Fifth Surface

K = −5.05470e−001   A4 = −7.27741e−005   A6 = 3.73182e−006
A8 = −2.45799e−007   A10 = 1.76529e−008   A12 = −3.51746e−010
A3 = −3.87527e−005   A5 = −2.11132e−007

Seventh Surface

K = −4.69102e−002   A4 = 1.74746e−005   A6 = −5.42923e−009
A8 = −1.60151e−008

Eighth Surface

K = −1.18954e+000   A4 = −7.91658e−006   A6 = 6.32232e−006
A8 = 8.48089e−009   A10 = −1.47795e−006

Ninth Surface

K = 0.00000e+000   A4 = −2.93614e−004   A6 = 5.36578e−005
A8 = −1.59915e−005

Thirteenth Surface

K = 7.18687e−001   A4 = −2.42564e−004   A6 = 1.56748e−005
A8 = −1.10692e−006   A10 = 6.15634e−008   A12 = −1.35784e−009
A3 = −8.55082e−005

Fourteenth Surface

K = 0.00000e+000   A4 = −2.29158e−004   A6 = 5.37351e−006

Various Data
Zoom Ratio 9.64

| Focal Length | 5.13 | 8.90 | 26.79 | 49.41 |
| F-number | 3.50 | 4.01 | 5.09 | 5.70 |
| Half Angle of View | 37.76 | 24.58 | 8.25 | 4.46 |
| Image Height | 3.33 | 3.88 | 3.88 | 3.88 |
| Total Lens Length | 44.47 | 40.59 | 50.85 | 59.58 |
| BF | 5.52 | 8.11 | 12.08 | 7.09 |
| d3 | 1.34 | 4.48 | 17.49 | 24.62 |
| d7 | 19.84 | 10.32 | 2.03 | 0.40 |
| d12 | 5.96 | 5.86 | 7.44 | 15.66 |
| d14 | 4.48 | 7.07 | 11.04 | 6.05 |

Zoom Lens Unit Data

| Unit | Starting Surface | Focal Length |
|---|---|---|
| 1 | 1 | 44.63 |
| 2 | 4 | −8.77 |
| 3 | 8 | 11.64 |
| 4 | 13 | 22.00 |

TABLE 1

| | Numerical Example | | | | | |
|---|---|---|---|---|---|---|
| Condition | 1 | 2 | 3 | 4 | 5 | 6 |
| (1) | 9.18 | 9.34 | 7.57 | 11.52 | 11.06 | 8.71 |
| (2) | 0.181 | 0.171 | 0.159 | 0.139 | 0.240 | 0.177 |
| (3) | 41.9 | 41.6 | 42.2 | 52.4 | 40.7 | 38.1 |
| (4) | 0.555 | 0.589 | 0.674 | 0.543 | 0.617 | 0.585 |
| (5) | 0.488 | 0.429 | 0.415 | 0.328 | 0.516 | 0.445 |
| (6) | 0.909 | 0.921 | 0.445 | 0.777 | 1.515 | 0.796 |
| (7) | 0.324 | 0.333 | 0.317 | 0.299 | 0.172 | 0.316 |
| (8) | 2.27 | 2.27 | 2.15 | 2.81 | 2.14 | 2.27 |
| (9) | 0.443 | 0.622 | 0.308 | 0.638 | 1.096 | 0.470 |
| (10) | 0.307 | 0.439 | 0.201 | 0.275 | 0.477 | 0.345 |
| (11) | 3.510 | 3.637 | 4.525 | 4.365 | 2.453 | 3.669 |
| (12) | 0.482 | 0.532 | 0.514 | 0.591 | 0.548 | 0.529 |
| (13) | 2.0007 | 2.0007 | 2.0463 | 2.0482 | 2.1643 | 1.8467 |
| (14) | 0.0386 | 0.0575 | 0.0250 | 0.0349 | 0.0542 | 0.0479 |
| (15) | 1.79 | 1.79 | 1.73 | 1.84 | 1.90 | 1.74 |

Next, an exemplary embodiment of a digital still camera, in which the zoom lens according to the exemplary embodiment is used as a photographic optical system, will be described with reference to FIG. 13.

In FIG. 13, the digital still camera includes a camera body 20, and a photographic optical system 21 configured by one of the zoom lenses described in the first to sixth exemplary embodiments. A solid-state image sensor (photoelectric conversion element) 22, such as a CCD sensor or a CMOS sensor, is built in the camera body 20 and configured to receive an object image formed by the photographic optical system 21. A memory 23 is configured to record information about the object image photoelectrically converted by the solid-state image sensor 22. A viewfinder 24 includes a liquid crystal display (LCD) panel and is configured to allow a user to observe the object image formed on the solid-state image sensor 22.

By applying the zoom lens according to each exemplary embodiment of the present invention to the image pickup apparatus such as a digital still camera, the present invention can implement a small-size image pickup apparatus having a high variable magnification ratio and high optical performance.

The zoom lens according to each exemplary embodiment of the present invention can also be applied to a mirrorless single-lens reflex camera having no quick-return mirror.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-016350 filed Jan. 30, 2012, which is hereby incorporated by reference herein in its entirety.

What is claimed is:

1. A zoom lens comprising, in order from an object side to an image side:
   a first lens unit having positive refractive power;
   a second lens unit having negative refractive power;
   a third lens unit having positive refractive power; and
   a fourth lens unit having positive refractive power,
   wherein, during zooming from a wide-angle end to a telephoto end, each lens unit moves in such a manner that a distance between the first lens unit and the second lens unit increases, and a distance between the second lens unit and the third lens unit decreases,
   wherein each of the first lens unit, the second lens unit, and the third lens unit consists of a single positive lens and a single negative lens, and the fourth lens unit consists of a single positive lens, and
   wherein the following conditions are satisfied:

$6.0 < f1/fw < 20.0$ $0.05 < |f2|/ft < 0.40$ where fw and ft are focal lengths of the entire zoom lens at the wide-angle end and the telephoto end, respectively, and f1 and f2 are focal lengths of the first lens unit and the second lens unit, respectively.

2. The zoom lens according to claim 1, wherein the following condition is satisfied:

$20 < vd3p - vd3n < 70$ where vd3p and vd3n are Abbe numbers of materials of the positive lens and the negative lens of the third lens unit, respectively.

3. The zoom lens according to claim 1, wherein the following condition is satisfied:

$0.3 < f3p/f3n < 0.9$ where f3p and f3n are focal lengths of the positive lens and the negative lens of the third lens unit, respectively.

4. The zoom lens according to claim 1, wherein the following condition is satisfied:

$0.2 < f4/ft < 0.7$ where f4 is a focal length of the fourth lens unit.

5. The zoom lens according to claim 1, wherein the following condition is satisfied:

$0.1 < (\beta 3t/\beta 3w)/(\beta 2t/\beta 2w) < 2.5$ where $\beta 2w$ and $\beta 2t$ are lateral magnifications of the second lens unit at the wide-angle end and the telephoto end, respectively, and $\beta 3w$ and $\beta 3t$ are lateral magnifications of the third lens unit at the wide-angle end and the telephoto end, respectively.

6. The zoom lens according to claim 1, wherein the following condition is satisfied:

$0.05 < (m1 \times m2)/(f1 \times f2) < 0.60$ where m1 and m2 are amounts of movement of the first lens unit and the second lens unit during zooming from the wide-angle end to the telephoto end, respectively.

7. The zoom lens according to claim 1, wherein the following condition is satisfied:

$1.6 < f3/fw < 4.0$ where f3 is a focal length of the third lens unit.

8. The zoom lens according to claim 1, wherein the following condition is satisfied:

$0.1 < D2/|m2| < 3.0$ where m2 is an amount of movement of the second lens unit during zooming from the wide-angle end to the telephoto end, and D2 is a thickness of the second lens unit on an optical axis.

9. The zoom lens according to claim 1, wherein the following condition is satisfied:

$0.05 < (D2+D3)/(|m2|+|m3|) < 0.90$ where D2 and D3 are thicknesses of the second lens unit and the third lens unit on an optical axis, respectively, and m2 and m3 are amounts of movement of the second lens unit and the third lens unit during zooming from the wide-angle end to the telephoto end, respectively.

10. The zoom lens according to claim 1, wherein the following condition is satisfied:

$1.8 < \beta 2t/\beta 2w < 7.0$ where $\beta 2w$ and $\beta 2t$ are lateral magnifications of the second lens unit at the wide-angle end and the telephoto end, respectively.

11. The zoom lens according to claim 1, wherein the following condition is satisfied:

$0.35 < f3/f4 < 0.80$ where f3 and f4 are focal lengths of the third lens unit and the fourth lens unit, respectively.

12. The zoom lens according to claim 1, wherein the following condition is satisfied:

$1.7 < N1n < 2.6$ where N1n is a refractive index of a material of the negative lens of the first lens unit.

13. The zoom lens according to claim 1, wherein the following condition is satisfied:

$0.005 < D3/Lt < 0.090$ where D3 is a thickness of the third lens unit on an optical axis, and Lt is a total lens length at the telephoto end.

14. The zoom lens according to claim 1, wherein the following condition is satisfied:

$$1.0 < (1-\beta 3t)/\beta 4t < 2.5$$

where $\beta 3t$ and $\beta 4t$ are lateral magnifications of the third lens unit and the fourth lens unit, respectively.

15. The zoom lens according to claim 1, wherein the zoom lens is configured to form an image on a solid-state image sensor.

16. An image pickup apparatus comprising:
a zoom lens; and
a solid-state image sensor configured to receive an image formed by the zoom lens,
wherein the zoom lens comprises, in order from an object side to an image side:
a first lens unit having positive refractive power;
a second lens unit having negative refractive power;
a third lens unit having positive refractive power; and
a fourth lens unit having positive refractive power,
wherein, during zooming from a wide-angle end to a telephoto end, each lens unit moves in such a manner that a distance between the first lens unit and the second lens unit increases, and a distance between the second lens unit and the third lens unit decreases,
wherein each of the first lens unit, the second lens unit, and the third lens unit consists of a single positive lens and a single negative lens, and the fourth lens unit consists of a single positive lens, and
wherein the following conditions are satisfied:

$$6.0 < f1/fw < 20.0$$

$$0.05 < |f2|/ft < 0.40$$

where fw and ft are focal lengths of the entire zoom lens at the wide-angle end and the telephoto end, respectively, and f1 and f2 are focal lengths of the first lens unit and the second lens unit, respectively.

* * * * *